US012273470B2

(12) United States Patent
Zhang

(10) Patent No.: US 12,273,470 B2
(45) Date of Patent: Apr. 8, 2025

(54) DATA PROCESSING METHOD AND APPARATUS, INTELLIGENT DEVICE, AND STORAGE MEDIUM

(71) Applicant: TENCENT TECHNOLOGY (SHENZHEN) COMPANY LIMITED, Shenzhen (CN)

(72) Inventor: Tao Zhang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 295 days.

(21) Appl. No.: 17/949,062

(22) Filed: Sep. 20, 2022

(65) Prior Publication Data

US 2023/0023857 A1 Jan. 26, 2023

Related U.S. Application Data

(63) Continuation of application No. PCT/CN2021/112020, filed on Aug. 11, 2021.

(30) Foreign Application Priority Data

Aug. 26, 2020 (CN) .......................... 202010867531.6

(51) Int. Cl.
*H04L 9/00* (2022.01)
*G06F 21/64* (2013.01)
(Continued)

(52) U.S. Cl.
CPC .............. *H04L 9/50* (2022.05); *G06F 21/64* (2013.01); *H04L 9/30* (2013.01); *H04L 9/3268* (2013.01); *H04L 9/3297* (2013.01)

(58) Field of Classification Search
CPC . H04L 9/50; H04L 9/30; H04L 9/3268; H04L 9/3297; G06F 21/64; G06F 21/645;
(Continued)

(56) References Cited

U.S. PATENT DOCUMENTS 11,227,460 B2 * 1/2022 Meadow ............... H04W 4/021
2019/0295050 A1 * 9/2019 Chalkias ............ G06Q 20/3829
(Continued)

FOREIGN PATENT DOCUMENTS

CN  107391944 A    11/2017
CN  109871709 A  *  6/2019
(Continued)

OTHER PUBLICATIONS

The European Patent Office (EPO) The Extended European Search Report for 21860140.9 Sep. 15, 2023 11 Pages.
(Continued)

*Primary Examiner* — Sm A Rahman
(74) *Attorney, Agent, or Firm* — ANOVA LAW GROUP, PLLC

(57) ABSTRACT

Embodiments of this application disclose a data processing method. The method includes obtaining data that need to be verified from a target trusted computing node; obtaining first ledger data corresponding to the data that need to be verified, the first ledger data being obtained by signing a first message digest by using a private key of the target trusted computing node and being stored in the blockchain network by the target trusted computing node, and the first message digest being obtained by performing message digest calculation on raw data; decrypting the first ledger data by using a public key of the target trusted computing node to obtain the first message digest; performing message digest calculation on the data that need to be verified to obtain a second message digest; and determining a verification result according to the first message digest and the second message digest.

20 Claims, 8 Drawing Sheets

(51) Int. Cl.
*H04L 9/30* (2006.01)
*H04L 9/32* (2006.01)

(58) Field of Classification Search
CPC ... G06F 21/74; G06F 21/602; G06Q 2220/00; G06Q 30/018; G06Q 30/0248; G06Q 30/0251; G06Q 30/0609
See application file for complete search history.

(56) References Cited

U.S. PATENT DOCUMENTS

| | | | |
|---|---|---|---|
| 2020/0099723 A1 | 3/2020 | Bailey | |
| 2020/0336907 A1* | 10/2020 | Jain | H04L 9/3236 |
| 2021/0049716 A1 | 2/2021 | Li | |

FOREIGN PATENT DOCUMENTS

| | | | |
|---|---|---|---|
| CN | 110400164 A | | 11/2019 |
| CN | 110492990 A | | 11/2019 |
| CN | 110543501 A | * | 12/2019 |
| CN | 110544095 A | | 12/2019 |
| CN | 110635913 A | | 12/2019 |
| CN | 110874747 A | | 3/2020 |
| CN | 111226249 A | | 6/2020 |
| CN | 111522874 A | | 8/2020 |
| CN | 111737724 A | | 10/2020 |
| CN | 112825522 A | * | 5/2021 |

OTHER PUBLICATIONS

Mühlberger, Roman, et al. "Extracting event logs for process mining from data stored on the blockchain." International Conference on Business Process Management. Cham: Springer International Publishing, 2019. 13 pages.

China National Intellectual Property Administration (CNIPA) Office Action 1 for 202010867531.6 Oct. 14, 2020 14 Pages (including translation).

The World Intellectual Property Organization (WIPO) International Search Report for PCT/CN2021/112020 Nov. 11, 2021 7 Pages (including translation).

Victor Costan et al. "Intel SGX Explained", 2016, Computer Science and Artificial Intelligence Laboratory.

* cited by examiner

DATA PROCESSING METHOD AND APPARATUS, INTELLIGENT DEVICE, AND STORAGE MEDIUM

RELATED APPLICATIONS

This application is a continuation of PCT Application No. PCT/CN2021/112020, filed on Aug. 11, 2021, which in turn claims priority to Chinese Patent Application No. 202010867531.6, entitled "DATA PROCESSING METHOD AND APPARATUS, INTELLIGENT DEVICE, AND STORAGE MEDIUM" filed on Aug. 26, 2020. The two applications are both incorporated by reference in their entirety.

FIELD OF THE TECHNOLOGY

The present disclosure relates to the field of computer technologies, and specifically, to a data processing method and apparatus, an intelligent device, and a computer-readable storage medium.

BACKGROUND OF THE DISCLOSURE

With continuous development of computer technologies, many data transfer scenarios involve a process of verifying whether data is trustworthy. For example, user A submits information to user B. However, the information submitted by user A is confidential and has not been disclosed through public media or a network. Therefore, after obtaining the information from user A, user B cannot determine whether the information provided by user A has been tampered with. Fake information may mislead user B.

SUMMARY

Embodiments of this application provide a data processing method and apparatus, a device, and a computer-readable storage medium, to better ensure that data is trustworthy.

One aspect of this application provides a data processing method, including obtaining data that need to be verified from a target trusted computing node; obtaining first ledger data corresponding to the data that need to be verified from an accessed blockchain network, the first ledger data being obtained by signing a first message digest by using a private key of the target trusted computing node and being stored in the blockchain network by the target trusted computing node, and the first message digest being obtained by performing message digest calculation on raw data corresponding to the data that need to be verified; decrypting the first ledger data by using a public key of the target trusted computing node to obtain the first message digest; performing message digest calculation on the data that need to be verified to obtain a second message digest; and determining a verification result of the data that need to be verified according to the first message digest and the second message digest.

Another aspect of this application provides another data processing method, applied to a target trusted computing node, and including sending remote proof information corresponding to the target trusted computing node and a public key of the target trusted computing node to a blockchain network, to obtain a certificate corresponding to the target trusted computing node from the blockchain network; obtaining raw data; performing message digest calculation on the raw data to obtain a message digest of the raw data, and signing the message digest by using a private key of the target trusted computing node to obtain ledger data; uploading the ledger data to the blockchain network, and providing the blockchain network with the certificate to prove that the ledger data is trustworthy; and sending data that need to be verified corresponding to the raw data to a first trusted computing node, so that the first trusted computing node performs verification on the data that need to be verified by using the ledger data.

Another aspect of this application provides a non-transitory computer-readable storage medium, storing a computer program, and the computer program, when executed by a processor, causing the data processing method described above to be implemented.

Correspondingly, an embodiment of this application provides a computer program product or a computer program, including computer instructions, the computer instructions being stored in the computer-readable storage medium. A processor of a computer device reads the computer instructions from the computer-readable storage medium, and the processor executes the computer instructions to cause the computer device to perform the data processing method described above.

BRIEF DESCRIPTION OF THE DRAWINGS

To describe the technical solutions in the embodiments of the present disclosure or in the existing technologies more clearly, the following briefly describes the accompanying drawings required for describing the embodiments or the existing technologies. Apparently, the accompanying drawings in the following description show only some embodiments of the present disclosure, and a person of ordinary skill in the art may still derive other drawings from these accompanying drawings without creative efforts.

DESCRIPTION OF EMBODIMENTS

Figure 1A:
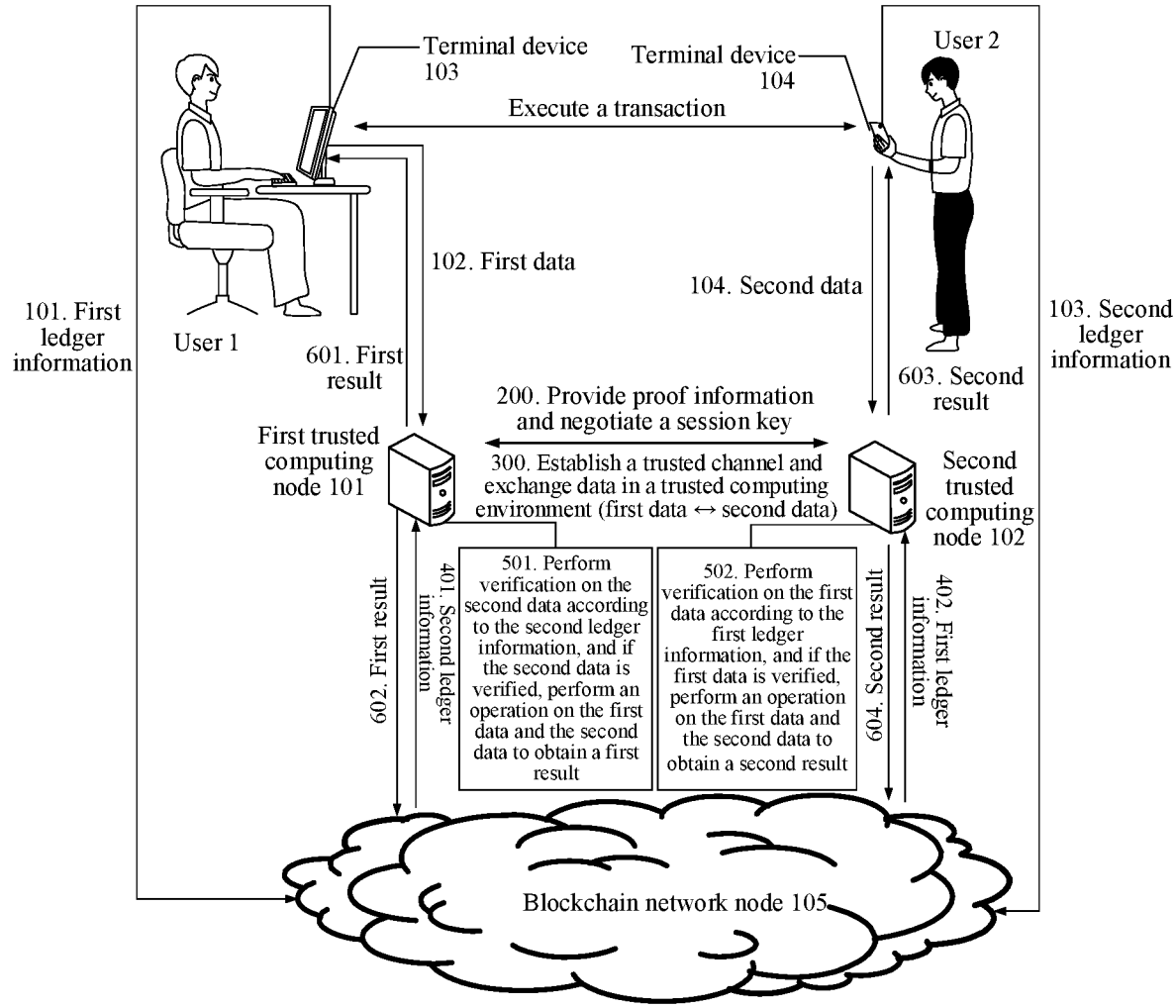
FIG. 1A is a scenario architecture diagram of data processing according to an embodiment of this application.

The following clearly and completely describes the technical solutions in the embodiments of the present disclosure with reference to the accompanying drawings in the embodiments of the present disclosure.

The embodiments of this application involve a blockchain, a blockchain network, and a trusted computing node. The blockchain is a chain data structure that combines data blocks in sequence in chronological order and a distributed ledger that cryptographically ensures that data is untamperable and unforgeable. The blockchain is essentially a decentralized database and a series of associated data blocks generated by using a cryptographic method. Each data block includes information about a batch of network transactions for verifying the validity of the information (for anti-counterfeiting) and generating a next block. The blockchain may include a blockchain underlying platform, a platform product service layer, and application service layer. In a process of depositing a certificate, the trusted computing node may store, in the blockchain, ledger data obtained after processing raw data.

The blockchain underlying platform may include user management, basic service, smart contract, and other processing modules. The user management module is responsible for management of identity information of all blockchain participants, including maintenance of public and private key generation (account management), key management, maintenance of a correspondence between real identities and blockchain addresses of users (rights management), and the like, supervising and auditing, under authorization, transaction statuses of some real identities, and providing rule configuration for risk control (risk control audit). The basic service module is deployed on all blockchain node devices, and configured to verify validity of a service request and record a valid request to a storage after completing consensus. For a new service request, the basic service module first parses and authenticates interface adaptation (interface adaptation), then encrypts service information by using a consensus algorithm (consensus management), transmits the encrypted service information to a shared ledger completely and consistently (network communication), and records and stores the encrypted service information. The smart contract module is responsible for contract registration and issuance, contract triggering, and contract execution. A developer may define contract logic through a particular programming language, publish the contract logic on the blockchain (contract registration), and invoke, according to logic of contract terms, a key or another event to trigger execution to complete the contract logic. In the embodiments of this application, after receiving a contract invocation request, the blockchain network may invoke corresponding data according to content of the contract, and send the data to a sender of the contract invocation request, or store data provided by a sender of the contract invocation request into the blockchain network.

In the embodiments of this application, when data needs to be disclosed, a node in the blockchain network may perform verification on the data that needs to be disclosed to ensure trustworthiness of the data. The blockchain network is a distributed application architecture that distributes tasks and workloads among peers and is a form of networking or a network formed by a peer-to-peer computing model in an application layer. The blockchain network includes a plurality of interconnected computers. These computers are also referred to as node devices of the blockchain network. In a blockchain network environment, the plurality of interconnected computers are in a peer-to-peer position. The computers have the same function, and there is no master-slave distinction. A computer can be used as a server to set shared resources for use by other computers in the network; or may be used as a workstation. The entire network does not rely on a dedicated centralized server, and there is no dedicated workstation. Each computer in the network can both serve as a requester of a network service, and respond to a request from another computer to provide a resource, a service, and content.

The trusted computing (TC) node is a node device that includes a trusted computing environment (Trusted Execution Environment, TEE) and a multimedia execution environment (Rich Execution Environment, REE) on a terminal device. The TEE includes trusted hardware and software resources such as a processor, a secure storage, a trusted user interface (TUI), a trusted operating system (TOS), and a trusted application (TA) on the terminal device to construct a more secure operating environment than the REE. To ensure security of TEE resources, resources accessible to the REE are also accessible to the TEE, but conversely, trusted resources on the TEE are accessible only to other trusted resources unless there is an explicit authorization from the TEE. The TEE generates a public-private key pair through asymmetric encryption, and writes a private key into a chip during manufacturing of the chip, so that a file encrypted by using a public key corresponding to the chip can be decrypted only in the chip to obtain information in the file. A private key in each chip is unique and untamperable. In this way, in this operating environment isolated from the REE, personal information of users can be stored and processed more securely and operations that require high confidentiality such as electronic payments can be performed. In the embodiments of this application, data is processed in the trusted computing environment of the computing node to ensure trustworthiness of a data processing result.

The embodiments of this application design a mechanism for intercommunication with the blockchain network for off-chain data outside the blockchain network, which can provide a proof of reliability for the off-chain data, allowing the off-chain data to interact with on-chain information. In some scenarios in which the off-chain data is private data, it is possible to not leak the off-chain data during on-chain and off-chain interactions. When data is generated, the trusted computing environment signs the data and stores the signature on the blockchain network, and raw data is still stored in a privacy protection environment. When needing to interact with the off-chain data, the blockchain network may interact with the trusted computing environment, and verify and process the off-chain data by using the trusted computing environment, and publicize a result on the chain after authentication. This design provides a reliable way for the blockchain network to access data while the data does not go out of the domain, and ensures both reliability of the private data involved in the interaction and reliability of logic used for processing the data off-chain.

Referring to FIG. 1A, FIG. 1A is a scenario architecture diagram of data processing according to an embodiment of this application. As shown in FIG. 1A, the scenario architecture diagram includes a trusted computing node 101, a trusted computing node 102, a terminal device 103, a terminal device 104, and a blockchain network node 105. The terminal device 103 and the terminal device 104 are devices used by users. The first trusted computing node 101 is a special-purpose device in a trusted computing environment, or the first trusted computing node 101 and the terminal device 103 may alternatively be the same device that can achieve trusted computing. Similarly, the second trusted computing node 102 may also be a special-purpose device in the trusted computing environment, or the second trusted computing node 102 and the terminal device 104 may alternatively be the same device that can achieve trusted computing. The trusted computing node 101, the trusted computing node 102, the terminal device 103, and the terminal device 104 may include, but are not limited to: smartphones (such as Android phones or iOS phones), tablet computers, portable personal computers, mobile Internet devices (MIDs), and other devices. This is not limited in the embodiments of this application. The first trusted computing node 101 and the second trusted computing node 102 each may alternatively be an independent physical server, or a server cluster including a plurality of physical servers, or a distributed system. The blockchain network node 105 is a node device in a blockchain network. The blockchain network node 105 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The trusted computing node 101, the trusted computing node 102, the terminal device 103, the terminal device 104, and the blockchain network node 105 may be connected directly or indirectly in a wired or wireless communication manner. This is not limited herein in this application.

In the scenario of data processing shown in FIG. 1A, a data processing procedure mainly includes that a user 1 and a user 2 execute a transaction. In step 101, the user 1 uploads first ledger information to the blockchain network (for example, sends the first ledger information to the blockchain network node 105) through the terminal device 103, the first ledger information being obtained by signing a message digest of first data by using a private key corresponding to the terminal device 103. In step 102, the terminal device 103 stores the first data in the first trusted computing node 101. In an embodiment, the terminal device 103 first stores the first data in the first trusted computing node 101. The first trusted computing node 101 signs the message digest of the first data by using a private key corresponding to the first trusted computing node 101 to obtain the first ledger information, and uploads the first ledger information and a certificate of the first trusted computing node 101 to the blockchain network. The certificate of the first trusted computing node 101 is used for proving that the first trusted computing node 101 is a trusted computing node. Similarly, in step 103, the user 2 uploads second ledger information to the blockchain network through the terminal device 104, the second ledger information being obtained by signing a message digest of second data by using a private key corresponding to the terminal device 104. In step 104, the terminal device 104 stores the second data in the second trusted computing node 102. In an embodiment, the terminal device 104 first stores the second data in the second trusted computing node 102. The second trusted computing node 102 signs the message digest of the second data by using a private key corresponding to the second trusted computing node 102 to obtain second ledger information, and uploads the second ledger information and a certificate of the second trusted computing node 102 to the blockchain network. The certificate of the second trusted computing node 102 is used for proving that the second trusted computing node 102 is a trusted computing node. In step 200, the first trusted computing node 101 and the second trusted computing node 102 check remote proofs of each other, and negotiate a session key (for example, encryption with an asymmetric key or a symmetric key) after the check is passed. In step 300, the first trusted computing node 101 encrypts the first data by using the negotiated key, and sends the encrypted first data to the second trusted computing node 102. Similarly, the second trusted computing node 102 encrypts the second data by using the negotiated key, and sends the encrypted second data to the first trusted computing node 101.

In step 401, the first trusted computing node 101 decrypts the encrypted second data by using the negotiated key to obtain the second data, and obtains the second ledger information corresponding to the second data from the blockchain network. In step 402, the second trusted computing node 102 decrypts the encrypted first data by using the negotiated key to obtain the first data, and obtains the first ledger information corresponding to the first data from the blockchain network. In step 501, the first trusted computing node 101 performs verification on the second data according to the second ledger information (decrypts the second ledger information by using a public key corresponding to the second trusted computing node 102 to obtain the message digest of the second data, calculates message digest verification information by using the second data, verifies whether the message digest verification information matches the message digest of the second data, and obtains a verification result), and if the second data is verified, processes the first data and the second data (for example, calculates an intersection set or a conversion rate) to obtain a first result. In step 502, the second trusted computing node 102 performs verification on the first data according to the first ledger information, and if the first data is verified, processes the first data and the second data to obtain a second result.

In step 601, the first trusted computing node 101 transfers the first result to the terminal device 103, so that the terminal device 103 presents the first result to the user 1. In step 602, the first trusted computing node 101 encrypts the first result by using the public key corresponding to the second trusted computing node 102, and uploads the encrypted first result and the certificate of the first trusted computing node 101 to the blockchain network, the certificate of the first trusted computing node 101 being used for proving that the first trusted computing node 101 is a trusted computing node. Correspondingly, in step 603, the second trusted computing node 102 transfers the second result to the terminal device 104, so that the terminal device 104 presents the second result to the user 2. In step 604, the second trusted computing node 102 encrypts the second result by using a public key corresponding to the first trusted computing node 101, and uploads the encrypted second result and the certificate of the second trusted computing node 102 to the blockchain network, the certificate of the second trusted computing node 102 being used for proving that the second trusted computing node 102 is a trusted computing node. The foregoing process is used as an example only. The first trusted computing node 101 and the second trusted computing node 102 may perform one or more of step 601 to step 604 according to specific situations.

Figure 1B:
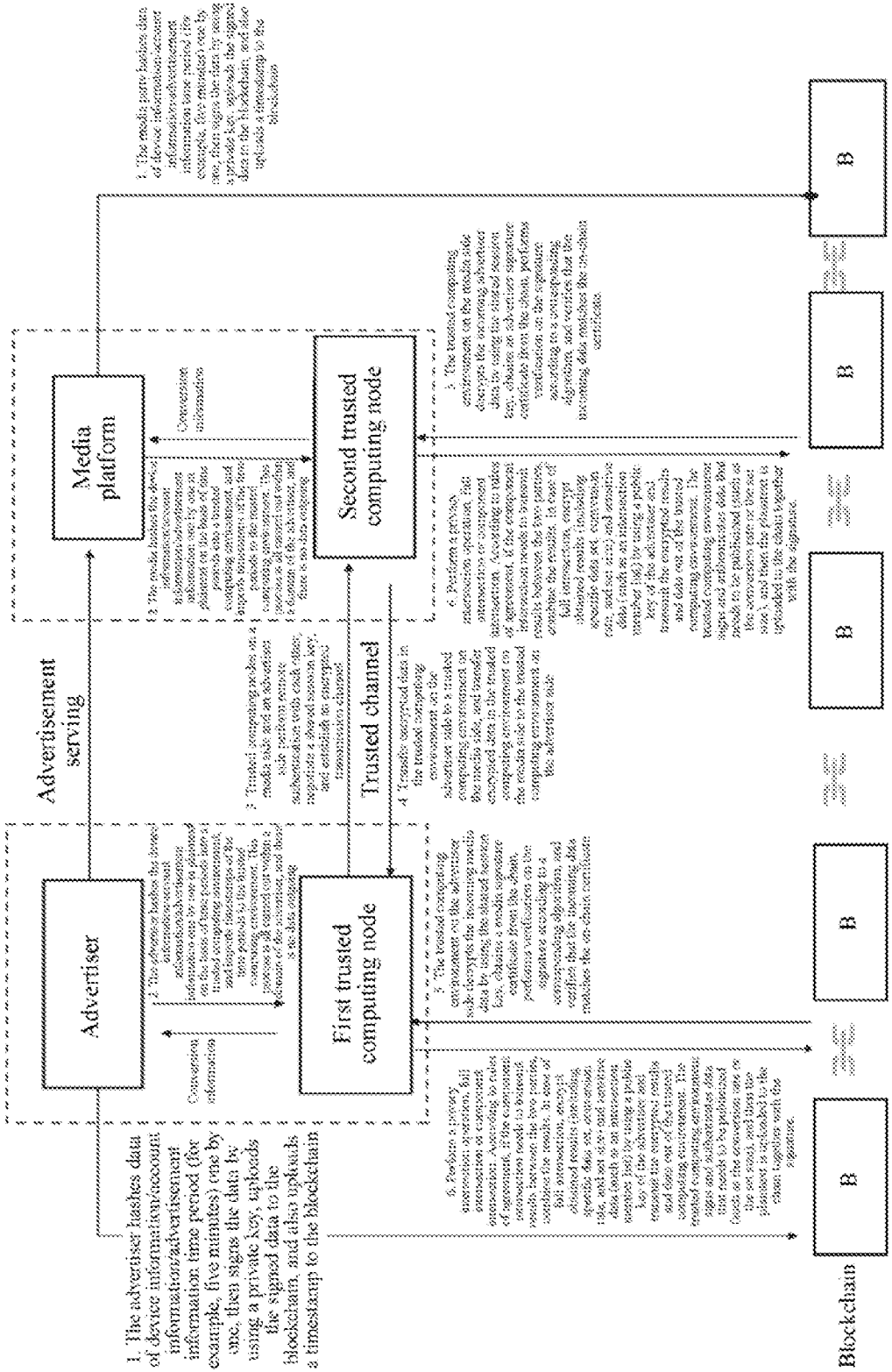
FIG. 1B is another scenario architecture diagram of data processing according to an embodiment of this application.

The data processing procedure of this embodiment is described below by using an example. For this example, refer to FIG. 1A and FIG. 1B. It is assumed that the terminal device 103 is a terminal device used by an advertiser, the terminal device 104 is a terminal device used by a media platform, and the executed transaction specifically means that the advertiser serves an advertisement on the media platform, so that the media platform pushes the advertisement to users. After detecting that the user A performs an operation on the served advertisement (such as clicking on the advertisement or purchasing a commodity in the advertisement), the advertiser signs a message digest of advertisement-associated data (where the advertisement-associated data includes an object identifier, an advertisement viewing time, a transaction amount, or the like of the user A) of the user A by using a private key corresponding to the advertiser (the terminal device 103 or the first trusted computing node 101) to obtain first ledger information, and uploads the first ledger information to the blockchain network. Similarly, after pushing advertisement information to the user B, the media platform signs a message digest of advertisement-associated data corresponding to the user B by using a private key corresponding to the media platform (the terminal device 104 or the second trusted computing node 102) to obtain second ledger information, and uploads the second ledger information to the blockchain network. When needing to account for the advertisement information, the advertiser and the media platform check remote proofs of each other, and negotiate a session key after the check is passed. The first trusted computing node 101 corresponding to the advertiser encrypts a first advertisement-associated data set by using the negotiated key, and sends the encrypted first advertisement-associated data set to the second trusted computing node 102 corresponding to the media platform, user advertisement-associated data included in the first advertisement-associated data set being advertisement-associated data of a user that performs an operation on the served advertisement within a preset time period. Similarly, the second trusted computing node 102 corresponding to the media platform encrypts a second advertisement-associated data set by using the negotiated key, and sends the encrypted second advertisement-associated data set to the first trusted computing node 101 corresponding to the advertiser, user advertisement-associated data included in the second advertisement-associated data set being advertisement-associated data of a user to whom the media platform has pushed the advertisement information within the preset time period. In an embodiment, the two parties may not need to determine the session key through negotiation. During data transmission between the first trusted computing node 101 and the second trusted computing node 102, the two parties only need to encrypt data by using the public keys of each other, and the first trusted computing node 101 or the second trusted computing node 102 decrypts the encrypted data by using the private key thereof.

The first trusted computing node 101 decrypts the encrypted second advertisement-associated data set by using the negotiated key to obtain the second advertisement-associated data set, obtains one or more pieces of ledger information corresponding to the second advertisement-associated data set from the blockchain network, and performs verification on the second advertisement-associated data set according to the obtain ledger information. If a verification result indicates that the second advertisement-associated data set is verified, the first trusted computing node 101 performs an intersection set operation on the first advertisement-associated data set and the second advertisement-associated data set to obtain a third advertisement-associated data set. A click through rate can be calculated based on a quantity of user object identifiers included in the second advertisement-associated data set and a quantity of user object identifiers included in the third advertisement-associated data set. A proportion of active users of media platform promotion can be calculated based on a quantity of user object identifiers included in the first advertisement-associated data set and the quantity of user object identifiers included in the third advertisement-associated data set. An active user is a user that performs an operation (such as clicking or executing a transaction) on the served advertisement. An object identifier of a user whose transaction amount is greater than a preset amount among users for which promotion is performed by the media platform can be sifted out based on a transaction amount of each piece of associated data in the third advertisement-associated data set. An object identifier of a user whose advertisement viewing time is greater than a preset time among users for which promotion is performed by the media platform can be sifted out based on an advertisement viewing time of each piece of associated data in the third advertisement-associated data set. Similarly, the second trusted computing node 102 decrypts the encrypted first advertisement-associated data set by using the negotiated key to obtain the first advertisement-associated data set, obtains one or more pieces of ledger information corresponding to the first advertisement-associated data set from the blockchain network, and performs verification on the first advertisement-associated data set according to the obtained ledger information. If a verification result indicates that the first advertisement-associated data set is verified, the second trusted computing node 102 may process the third advertisement-associated data set obtained by performing the intersection set operation on the first advertisement-associated data set and the second advertisement-associated data set. For a processing manner, refer to the processing manner of the first trusted computing node 101.

In this embodiment, after generating confidential data (for example, the user advertisement-associated data), the first trusted computing node generates a message digest of the confidential data, signs the message digest by using the private key of the first trusted computing node to obtain ledger data (for example, the first ledger information), and uploads the ledger data to the blockchain network. After obtaining the confidential data, the second trusted computing node may perform, by using the ledger data in the blockchain network, verification on the confidential data sent by the first trusted computing node, to ensure that the confidential data is trustworthy.

Figure 2A:
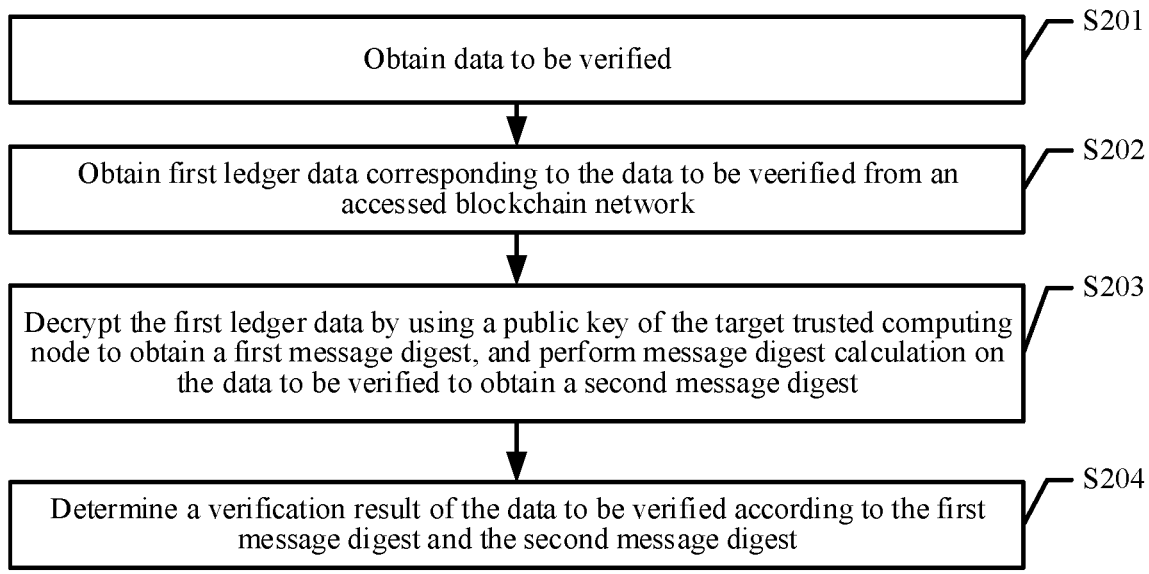
FIG. 2A is a flowchart of a data processing method according to an embodiment of this application.

Referring to FIG. 2A, FIG. 2A is a flowchart of a data processing method according to an embodiment of this application. The method may be performed by an intelligent device. The intelligent device may be specifically the first trusted computing node 101 or the second trusted computing node 102 shown in FIG. 1A. The method in this embodiment may include the following steps.

S201: Obtain data that need to be verified. The data that need to be verified is confidential data that is not disclosed, for example, advertisement promotion data within a time period. In in one embodiment, the intelligent device may obtain the data that need to be verified through another trusted computing node that communicates therewith. In another implementation, the intelligent device may obtain encrypted data corresponding to the data that need to be verified through another trusted computing node that communicates therewith. The encrypted data is obtained by encrypting the data that need to be verified by using a public key corresponding to the intelligent device. The intelligent device decrypts the encrypted data by using a private key thereof to obtain the data that need to be verified. The data that need to be verified may be sent by a target trusted computing node. When the intelligent device is the first trusted computing node 101 shown in FIG. 1A, the target trusted computing node is the second trusted computing node 102, and vice versa.

S202: Obtain first ledger data corresponding to the data that need to be verified from an accessed blockchain network. The first ledger data is obtained by signing a first message digest by using a private key corresponding to the target trusted computing node used for storing ledger data into a blockchain network. That is, the first ledger data for obtaining is obtained by signing a first message digest by using a private key of the target trusted computing node and is stored in the blockchain network by the target trusted computing node. The target trusted computing node may be the intelligent device, or may be a trusted computing node other than the intelligent device. The first message digest is obtained by the target trusted computing node after performing message digest calculation (for example, hash calculation) on raw data corresponding to the data that need to be verified. It can be understood that, if the raw data is not tampered with after generation, the data that need to be verified is the same as the raw data.

In one embodiment, after generating the raw data, the target trusted computing node performs message digest calculation on the raw data to obtain the first message digest, and signs the first message digest by using the private key of the target trusted computing node to obtain the first ledger data. The target trusted computing node uploads the first ledger data and a certificate of the target trusted computing node to the blockchain network. The certificate of the target trusted computing node is used for proving that the target trusted computing node is a trusted computing node. The trusted computing node cannot derive the raw data from the first message digest, that is, a node in the blockchain network cannot obtain the raw data from the first ledger data. The message digest calculation may be, for example, calculation performed based on a hash algorithm, and an obtained hash value is used as a message digest of the corresponding raw data. In other embodiments, the message digest calculation may alternatively be based on other families of algorithms such as a message digest (MD) algorithm, secure hash algorithms (SHAs), and a message authentication code (MAC) algorithm.

S203: Decrypt the first ledger data by using a public key of the target trusted computing node to obtain a first message digest, and perform message digest calculation on the data that need to be verified to obtain a second message digest. The first message digest and the second message digest are obtained by performing digest calculation by using the same message digest algorithm. For example, the first message digest is obtained after performing digest calculation on the raw data by using a hash algorithm 1, and the second message digest is obtained after performing digest calculation on the data that need to be verified by using the hash algorithm 1.

S204: Determine a verification result of the data that need to be verified according to the first message digest and the second message digest. In in one embodiment, if the first message digest matches the second message digest, the intelligent device determines that the data that need to be verified is not tampered with (that is, the verification result indicates that the data that need to be verified is trustworthy). If the first message digest does not match the second message digest, the intelligent device determines that the data that need to be verified is tampered with (that is, the verification result indicates that the data that need to be verified is not trustworthy). In an embodiment, for example, that digests match may mean that the first message digest and the second message digest are the same. In other embodiments, whether the first message digest matches the second message digest may alternatively be determined in other message digest matching determining manners.

When the intelligent device is specifically the first trusted computing node 101, after step S204, the method may further include: in response to that the verification result indicates that the data that need to be verified is authentic, processing the data that need to be verified and first data stored in the first trusted computing node to obtain a first result, and sending the first result to a terminal device associated with the first trusted computing node, where the processing the data that need to be verified and first data stored in the first trusted computing node includes intersection set calculation processing or conversion rate calculation processing.

In an embodiment, the data that need to be verified is encrypted data obtained by the target trusted computing node by encrypting the raw data by using a target key. When the intelligent device is specifically the first trusted computing node 101, step S201 may specifically include: receiving, from the target trusted computing node, a first slice of the target key that is encrypted by using the public key corresponding to the first trusted computing node, and decrypting the encrypted first slice of the target key by using the private key corresponding to the first trusted computing node to obtain the first slice of the target key; encrypting the first slice of the target key by using a public key of a third trusted computing node, and sending the encrypted first slice to the third trusted computing node; receiving, from the third trusted computing node, a second slice of the target key by using the public key corresponding to the first trusted computing node, and decrypting the encrypted second slice of the target key by using the private key corresponding to the first trusted computing node to obtain the second slice of the target key; obtaining the target key based on the first slice of the target key and the second slice of the target key; and decrypting the encrypted data by using the target key to obtain the data that need to be verified.

Figure 2B:
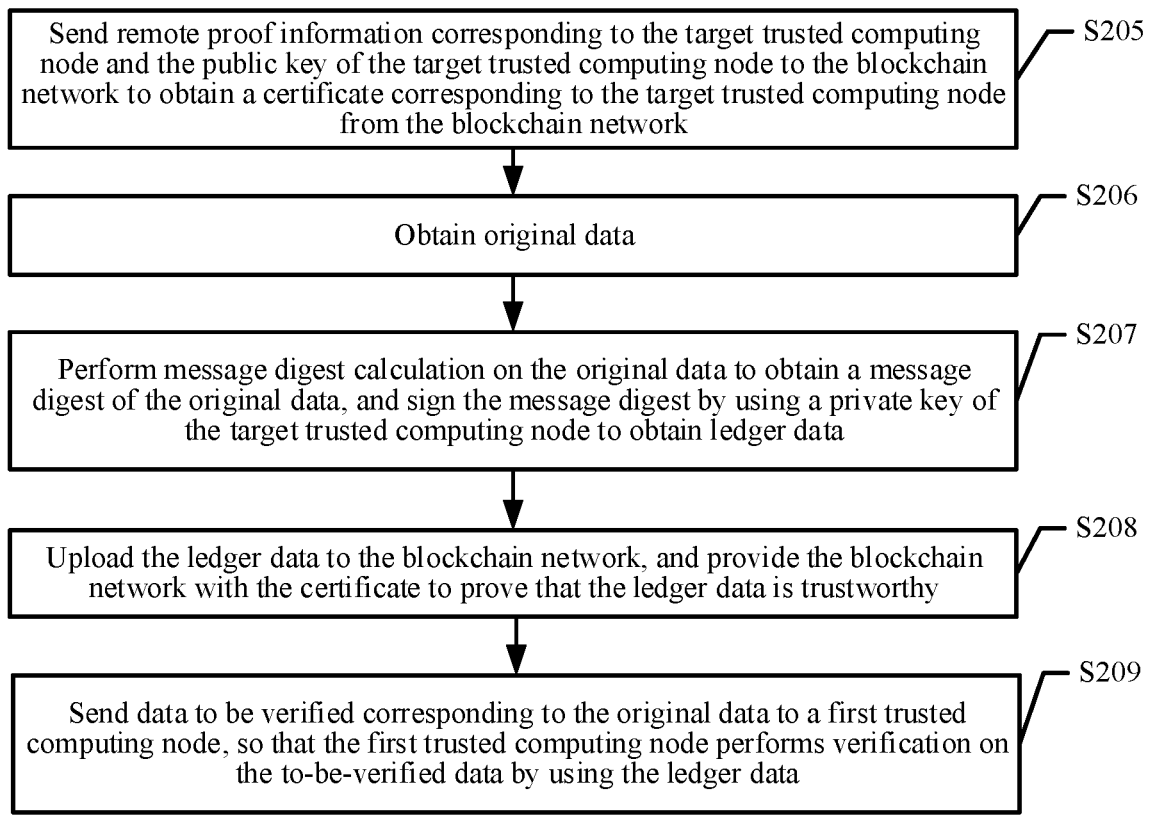
FIG. 2B is a flowchart of another data processing method according to an embodiment of this application.

FIG. 2B is a flowchart of another data processing method according to an embodiment of this application. Corresponding to the method depicted in FIG. 2A, the method may be performed by the target trusted computing node. Description is provided by using an example in which the method depicted in FIG. 2A is performed by the first trusted computing node, and the target trusted computing node in FIG. 2B is the second trusted computing node.

As shown in FIG. 2B, the data processing method includes the following steps:

Step S205. Send remote proof information corresponding to the target trusted computing node and the public key of the target trusted computing node to the blockchain network to obtain a certificate corresponding to the target trusted computing node from the blockchain network.

Step S206. Obtain raw data.

Step S207. Perform message digest calculation on the raw data to obtain a message digest of the raw data, and sign the message digest by using a private key of the target trusted computing node to obtain ledger data.

Step S208. Upload the ledger data to the blockchain network, and provide the blockchain network with the certificate to prove that the ledger data is trustworthy.

Step S209. Send data that need to be verified corresponding to the raw data to a first trusted computing node, so that the first trusted computing node performs verification on the data that need to be verified by using the ledger data.

In one embodiment, the raw data is service data. Therefore, the service data is obtained in step S206. In step S207, message digest calculation is performed on the service data to obtain a message digest corresponding to the service data. The message digest corresponding to the service data is added to a message digest set, the message digest set being used for storing message digests generated within a preset time period, and the message digest set recording at least two message digests. In response to detecting that the message digest set satisfies an on-chain condition, a message digest recorded in the message digest set is signed by using the private key corresponding to the target trusted computing node to obtain ledger data corresponding to the message digest set or ledger data. In step S208, the obtained ledger data corresponding to the message digest set is uploaded to the blockchain network for blockchain on-chain processing. On-chain means uploading (to the blockchain).

In one embodiment, the data that need to be verified is sent to N trusted computing nodes including the first trusted computing node, N being a positive integer. Step S209 includes: encrypting the raw data by using a target key to obtain encrypted data; and dividing the target key into N slices, encrypting a slice of a target key corresponding to each of the N trusted computing nodes by using a public key of the each trusted computing node, and sending, to the each trusted computing node, the encrypted data and the encrypted slice of the key that corresponds to the trusted computing node.

In this embodiment, after generating the confidential data, the target trusted computing node generates a message digest of confidential data, signs the message digest by using the private key of the target trusted computing node to obtain the ledger data, and uploads the ledger data to the blockchain network. After obtaining the confidential data, the intelligent device may perform, by using the ledger data in the blockchain network, verification on the confidential data sent by the target trusted computing node to ensure that the confidential data is trustworthy. In addition, the raw data is transmitted and processed between two trusted computing nodes, thereby ensuring that the data is not easily leaked and improving security of the data.

Figure 3A:
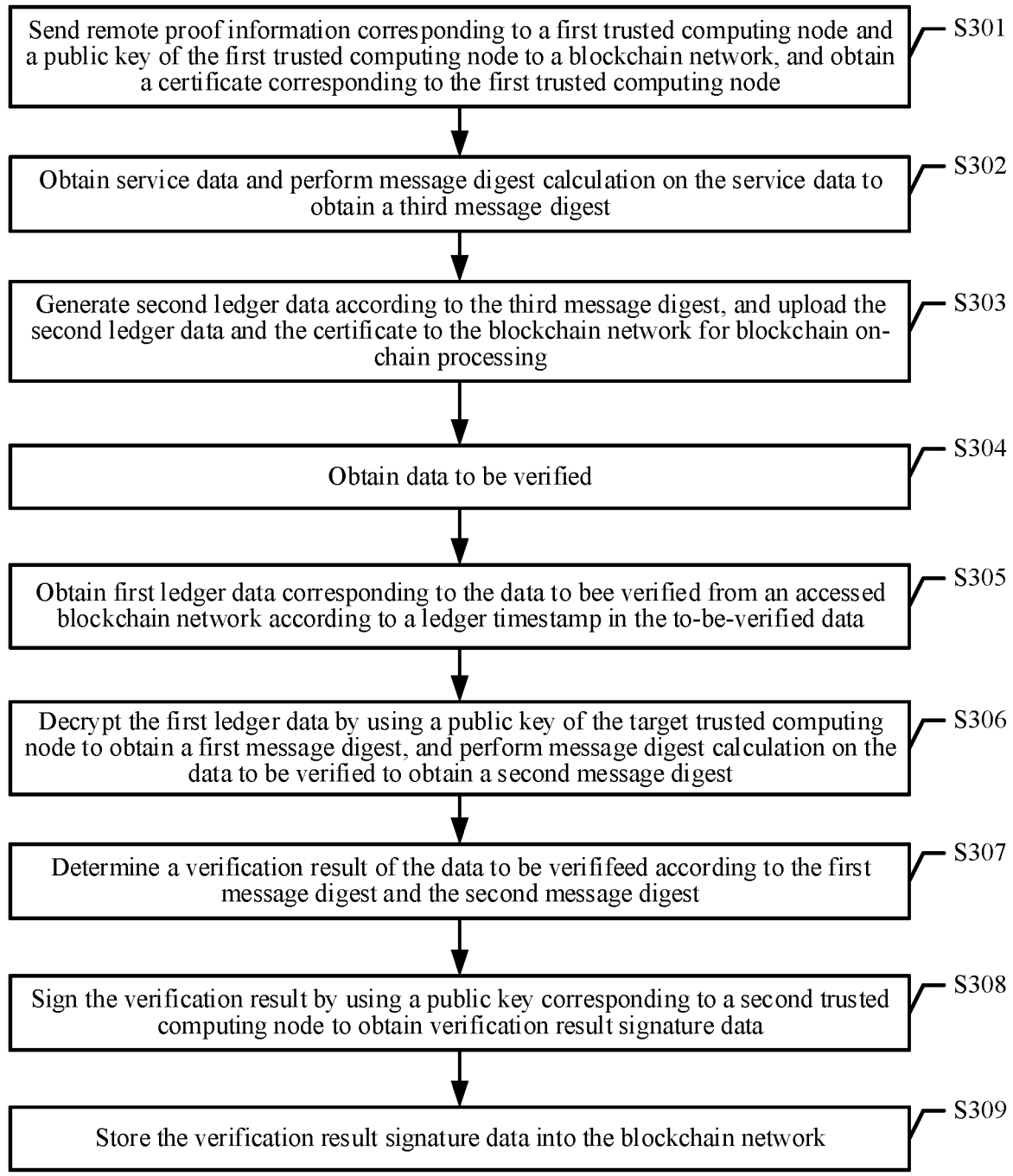
FIG. 3A is a flowchart of still another data processing method according to an embodiment of this application.

Referring to FIG. 3A, FIG. 3A is a flowchart of another data processing method according to an embodiment of this application. The method may be performed by an intelligent device. The intelligent device may be specifically the first trusted computing node 101 shown in FIG. 1A. The method in this embodiment includes the following steps.

S301: Send remote proof information corresponding to the first trusted computing node and a public key of the first trusted computing node to the blockchain network, and obtain a certificate corresponding to the first trusted computing node from the blockchain network. A remote proof mechanism generates a proof through hardware to declare a current operating environment of the intelligent device. The intelligent device may send the proof to a blockchain network node to indicate that the intelligent device is not tampered with. The blockchain network node may determine transmission and processing logic of messages in the intelligent device according to the proof, and screen out an intelligent device or a trusted computing node that has risks of leakage and insecurity in the transmission or processing links, thereby avoiding a risk of information leakage in intelligent devices.

Figure 4A:
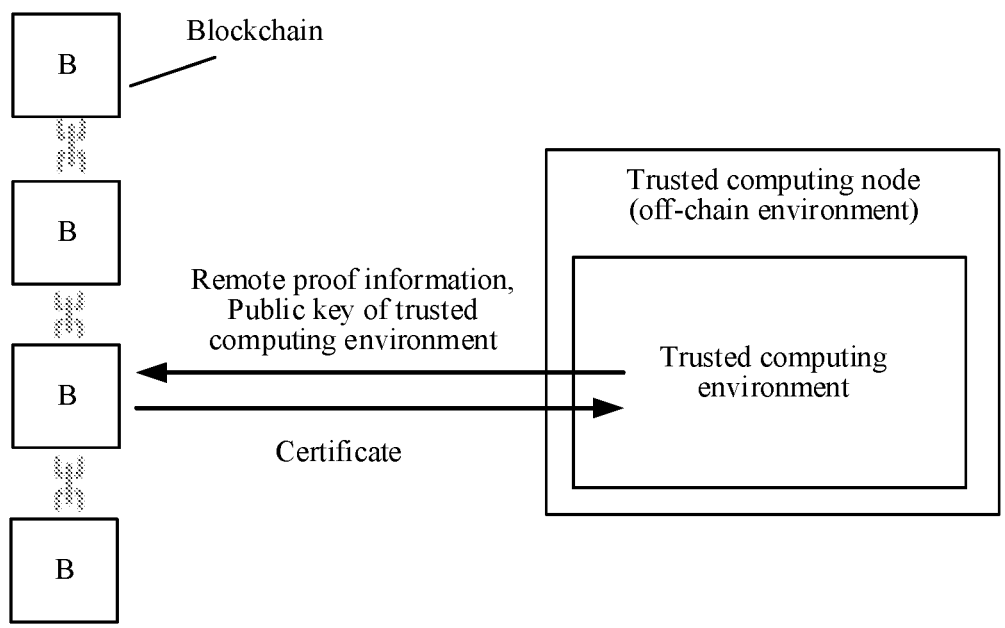
FIG. 4A is a schematic diagram of establishing a connection between a blockchain and an off-chain trusted computing node according to an embodiment of this application.

FIG. 4A is a schematic diagram of establishing a connection between a blockchain and an off-chain trusted computing node according to an embodiment of this application. As shown in FIG. 4A, the trusted computing node provides remote proof information and a public key of the trusted computing node (a trusted computing environment) to the blockchain for verification. After the remote proof information corresponding to the trusted computing node is verified, the blockchain network node allocates a corresponding certificate to the trusted computing node to prove that an operating environment in the trusted computing node is trustworthy (that is, there is no risk of tampering or data leakage, and the transmission and processing environment is secure). The intelligent device obtains the certificate corresponding to the first trusted computing node sent by the blockchain network node.

S302: Obtain service data and perform message digest calculation on the service data to obtain a third message digest. The service data is one type of the raw data. The service data refers to data that needs to be kept confidential and that is generated by the intelligent device during service processing, such as advertisement promotion data, customer transaction data, or an account statement.

S303: Generate second ledger data according to the third message digest, and upload the second ledger data and the certificate to the blockchain network for blockchain on-chain processing. When a frequency of message digest generation is less than a frequency threshold, the intelligent device may upload message digests to the blockchain network one by one (that is, each message digest corresponds to one piece of ledger data) for depositing certificates. When the frequency of message digest generation is greater than or equal to the frequency threshold, the intelligent device may upload the message digests to the blockchain network in batches (that is, at least two message digests correspond to one piece of ledger data) for depositing certificates.

Figure 3B:
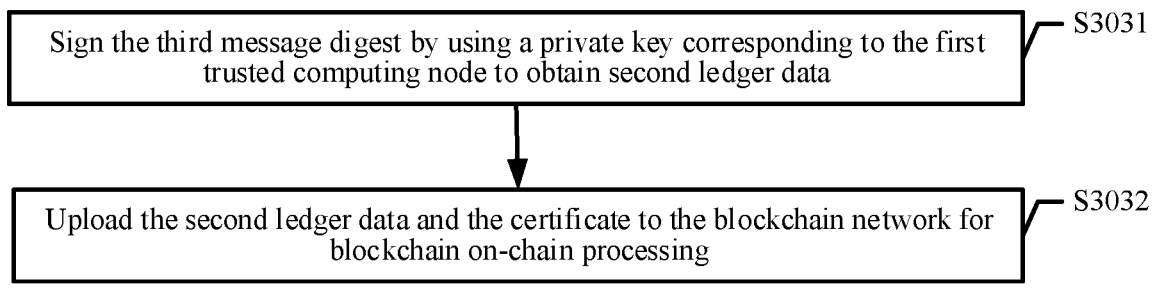
FIG. 3B is a flowchart of processing a message digest according to an embodiment of this application.

FIG. 3B is a flowchart of processing a message digest according to an embodiment of this application. As shown in FIG. 3B, in in one embodiment: S3031: Sign the third message digest by using a private key corresponding to the first trusted computing node to obtain second ledger data. A specific implementation of step S3031 is similar to step S202 of FIG. 2A in which the intelligent device signs the first message digest by using the private key corresponding to the first trusted computing node to obtain first ledger data. Details are not described herein again. S3032: Upload the second ledger data and the certificate to the blockchain network for blockchain on-chain processing. During on-chain processing of the second ledger data, the intelligent device provides the certificate for the blockchain network node to prove that the second ledger data is trustworthy. After determining that the certificate is correct, the blockchain network node stores the second ledger data into the blockchain network. It can be learned that the message digests of the service data can be on-chain one by one by performing step S3031 and step S3032.

Figure 3C:
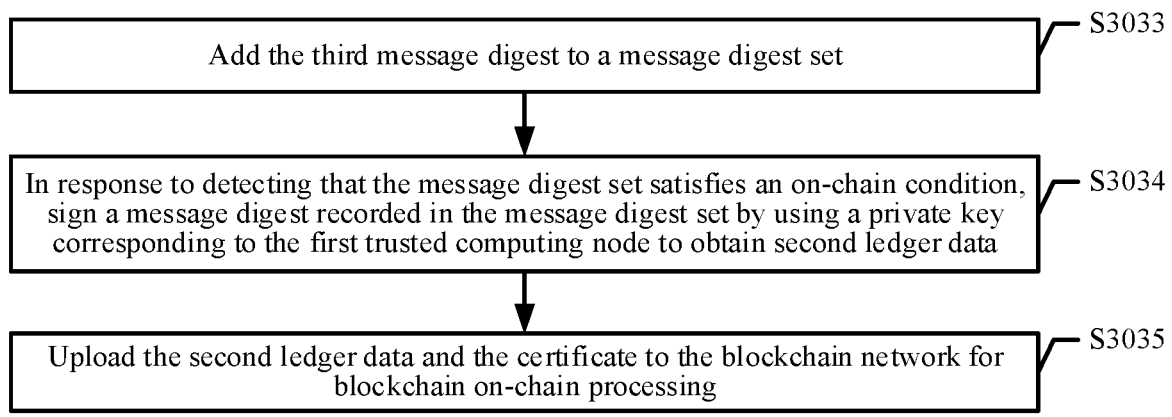
FIG. 3C is another flowchart of processing a message digest according to an embodiment of this application.

FIG. 3C is another flowchart of processing a message digest according to an embodiment of this application. As shown in FIG. 3C, in in one embodiment: S3033: Add the third message digest to a message digest set. The message digest set is used for storing message digests generated within a preset time period, and the message digest set records at least two message digests. S3034: In response to detecting that the message digest set satisfies an on-chain condition, sign a message digest recorded in the message digest set by using a private key corresponding to the first trusted computing node to obtain second ledger data. The on-chain condition includes: a current time reaches a preset time and the message digest set records at least two message digests; or a quantity of message digests in the message digest set reaches a threshold. S3035: Upload the second ledger data and the certificate to the blockchain network for blockchain on-chain processing. For a specific implementation of step S3035, refer to step S3032. Details are not described herein again. It can be learned that service data can be uploaded to the blockchain network in batches by performing steps S3033 to S3035.

S304: Obtain data that need to be verified. In in one embodiment, the data that need to be verified is carried in encrypted data. The encrypted data is obtained by encrypting the data that need to be verified by using the public key of the first trusted computing node. Therefore, the data that need to be verified can be obtained by decrypting the encrypted data by using the private key of the first trusted computing node. For example, during transmission of data that need to be verified to each other, the advertiser and the media platform encrypt their own data that need to be verified by using a public key corresponding to a trusted computing node at a peer end, generate their own encrypted data, and send the encrypted data to the peer end. After obtaining the encrypted data of the peer end, the advertiser and the media platform decrypt the encrypted data of the peer end by using private keys corresponding to their own trusted computing nodes to obtain the data that need to be verified of the peer end.

In another implementation, a sending node of data that need to be verified needs to send the data that need to be verified to N trusted computing nodes. The intelligent device is a $j^{th}$ trusted computing node in the N trusted computing nodes, j and N being positive integers, N being greater than or equal to 2, and j being less than or equal to N. The sending node of the data that need to be verified encrypts the service data by using a target key to obtain encrypted data, divides the target key into N slices, encrypts a corresponding slice of the target key by using a public key of each trusted computing node (for example, encrypts a slice of an $i^{th}$ target key by using a public key of an $i^{th}$ trusted computing node to obtain an $i^{th}$ encrypted key slice, i being a positive integer and i being less than or equal to N), and sends, to the each trusted computing node, an encrypted key slice corresponding to the trusted computing node and encrypted data (for example, sends the $i^{th}$ encrypted key slice and the encrypted data to the $i^{th}$ trusted computing node).

Correspondingly, after receiving a $j^{th}$ encrypted key slice, the intelligent device decrypts the $j^{th}$ encrypted key slice by using the private key corresponding to the first trusted computing node to obtain an $j^{th}$ key slice. Then, the intelligent device encrypts the $j^{th}$ key slice by using public keys of N−1 trusted computing nodes other than the intelligent device, respectively, sends the encrypted key slices to the corresponding N−1 trusted computing nodes, and obtains an encrypted key slice that is sent by each of the N−1 trusted computing nodes and that is encrypted by using the public key of the first trusted computing node. For example, the first trusted computing node encrypts the $j^{th}$ key slice by using a public key of a $k^{th}$ trusted computing node, sends the encrypted $j^{th}$ key slice to the $k^{th}$ trusted computing node, and obtains a target encrypted key slice sent by the $k^{th}$ trusted computing node. The target encrypted key slice is obtained by the $k^{th}$ trusted computing node by encrypting a $k^{th}$ key slice by using a public key of the $j^{th}$ trusted computing node. Subsequently, the intelligent device decrypts, by using the private key corresponding to the first trusted computing node, the obtained encrypted key slice sent by the each trusted computing node to obtain all key slices of the target key to obtain the target key. Then, the intelligent device decrypts, by using the target key, the encrypted data sent by the sending node of the data that need to be verified to obtain the data that need to be verified. In this implementation, the data that need to be verified is encrypted/decrypted by using a symmetric key. When a plurality of trusted computing nodes communicate or there is a large amount of data that need to be verified, use of the method can improve efficiency of data processing. In still another implementation, the intelligent device may be a sending node of the data that need to be verified.

S305: Obtain first ledger data corresponding to the data that need to be verified from an accessed blockchain network according to a ledger timestamp in the data that need to be verified. The ledger timestamp is an on-chain time of the raw data corresponding to the data that need to be verified. In in one embodiment, ledger data corresponding to the raw data is on-chain one by one (that is, on-chain in the manner of step S302 to step S304). The intelligent device obtains the first ledger data corresponding to the data that need to be verified from the accessed blockchain network according to the ledger timestamp. For example, it is assumed that the ledger timestamp is: 2020-07-08, 12:50:43, and a timestamp of ledger data 1 recorded in the blockchain is: 2020-07-08, 12:50:43, and a timestamp of ledger data 2 is: 2020-06-18, 13:43:28. In this case, the intelligent device obtains the ledger data 1 corresponding to the data that need to be verified from the accessed blockchain network according to the ledger timestamp.

In another implementation, ledger data corresponding to the raw data is packaged from a plurality of pieces and then simultaneously on-chain. The intelligent device obtains a ledger data set corresponding to the data that need to be verified from the accessed blockchain network according to the ledger timestamp, and obtains the first ledger data corresponding to the data that need to be verified from the ledger data set according to an identifier (such as a transaction serial number or a customer number) of the raw data or the service data.

In still another implementation, the intelligent device sends a first ledger data obtaining request to the blockchain network, the first ledger data obtaining request being used for triggering the blockchain network to invoke a first smart contract to obtain the first ledger data corresponding to the data that need to be verified. If the blockchain network node finds the first ledger data corresponding to the data that need to be verified, the intelligent device obtains the first ledger data of the blockchain network in response to the first ledger data obtaining request.

In another implementation, the raw data provided by the first trusted computing node (advertiser) shows that a target user performs X operations (such as clicking or conducting transactions) on advertisement data within a particular time period, X being a positive integer and X being greater than or equal to 2. The first trusted computing node may determine, based on a timestamp of verified advertisement distribution data provided by the media platform, that among the X operations performed by the target user on the advertisement data, Y operations are performed through advertisement data served by the media platform, Y being an integer greater than or equal to 0 and Y being less than or equal to X. For example, the user 1 separately clicks on advertisements at a timestamp 1 to a timestamp 5 during a day, and the media platform serves advertisement data for the user 1 at the timestamp 1, the timestamp 4, and the timestamp 5. Therefore, the advertiser determines that among the advertisement data in the five clicks of the user 1, the advertisement data in three clicks is served by the media platform.

S306: Decrypt the first ledger data by using a public key of the target trusted computing node to obtain a first message digest, and perform message digest calculation on the data that need to be verified to obtain a second message digest. In in one embodiment, the first message digest is obtained by the media platform by performing message digest calculation on an object identifier of a served user after the media platform serves an advertisement. The first ledger data is obtained by the media platform by signing the first message digest by using a private key of the media platform. The data that need to be verified is advertisement distribution data within a preset time provided by the media platform for the intelligent device (advertiser). The data that need to be verified includes a first user set. The first user set includes a first user object identifier. The first user object identifier is an object identifier of a user to whom the media platform has pushed advertisement information within the preset time period. The intelligent device decrypts the first ledger data by using a public key of the media platform to obtain a first message digest, and performs message digest calculation on the data that need to be verified to obtain a second message digest.

S307: Determine a verification result of the data that need to be verified according to the first message digest and the second message digest. In in one embodiment, if the first message digest matches the second message digest, the intelligent device determines that the data that need to be verified is authentic. If the first message digest does not match the second message digest, the intelligent device determines that the data that need to be verified is tampered with.

In an embodiment, when the verification result of S307 indicates that the data that need to be verified is authentic, the intelligent device may further obtain advertisement-associated data corresponding to the data that need to be verified. The advertisement-associated data includes a second user set. The second user set includes a second user object identifier. The second user object identifier is an object identifier of a user that performs an operation (such as clicking, viewing, or executing a transaction) on the served advertisement within the preset time period. The intelligent device performs an intersection set operation on the first user set and the second user set to obtain a third user set. It can be understood that the third user set includes a third user object identifier, and the third user object identifier is an object identifier of a user that performs an operation within the preset time period on the advertisement served by the media platform. The intelligent device determines advertisement promotion information based on the first user set, the second user set, and the third user set. For example, a click through rate can be calculated based on the first user set and the third user set, and a proportion of active users of media platform promotion can be calculated based on the second user set and the third user set.

In an embodiment, in addition to including user sets, the advertisement-associated data may further include advertisement transaction data, such as transaction amounts. In this case, after performing the intersection set operation on the first advertisement-associated data set and the second advertisement-associated data set, the intelligent device can sift out, based on a transaction amount of each piece of associated data in the third advertisement-associated data set, an object identifier of a user whose transaction amount is greater than a preset amount among users for which promotion is performed by the media platform. The advertisement-associated data may further include an advertisement viewing time. In this case, the intelligent device can sift out, based on an advertisement viewing time of each piece of associated data in the third advertisement-associated data set, an object identifier of a user whose advertisement viewing time is greater than a preset time among users for which promotion is performed by the media platform.

S308: Sign the verification result by using a public key corresponding to a second trusted computing node to obtain verification result signature data. The second trusted computing node is a node that needs to view the verification result. In in one embodiment, the second trusted computing node is a trusted computing node corresponding to the media platform. In another implementation, the second trusted computing node is a trusted computing node corresponding to the advertiser.

S309: Store the verification result signature data into the blockchain network. In in one embodiment, the intelligent device sends a request message to the blockchain network, the request message carrying the verification result signature data and a certificate of the intelligent device. The certificate is used for proving that the intelligent device is trustworthy. The request message is used for triggering the blockchain network to invoke a second smart contract to store the verification result signature data into the blockchain network. After the certificate of the intelligent device is verified, the blockchain network node stores the verification result signature data into the blockchain network. In another implementation, after remote proof information of the intelligent device is verified, the blockchain network node stores related information of the intelligent device (for example, an identifier of the intelligent device). In this case, the intelligent device sends a request message to the blockchain network, the request message carrying the verification result signature data. The blockchain network node determines, according to related information (such as the identifier of the intelligent device), that the intelligent device is trustworthy, and stores the verification result signature data into the blockchain network. It can be understood that in this implementation, the request message does not need to carry the certificate of the intelligent device. In still another implementation, the intelligent device directly sends the verification result signature data to the second trusted computing node.

Although step S301 to S309 in the foregoing method are described by using the first trusted computing node as an example, due to the possible similarity between trusted computing nodes, a method similar to the foregoing method is also applicable to another trusted computing node. For example, a method obtained by replacing the first trusted computing node in the steps in the foregoing method with another trusted computing node is applicable to the another trusted computing node.

Figure 4B:
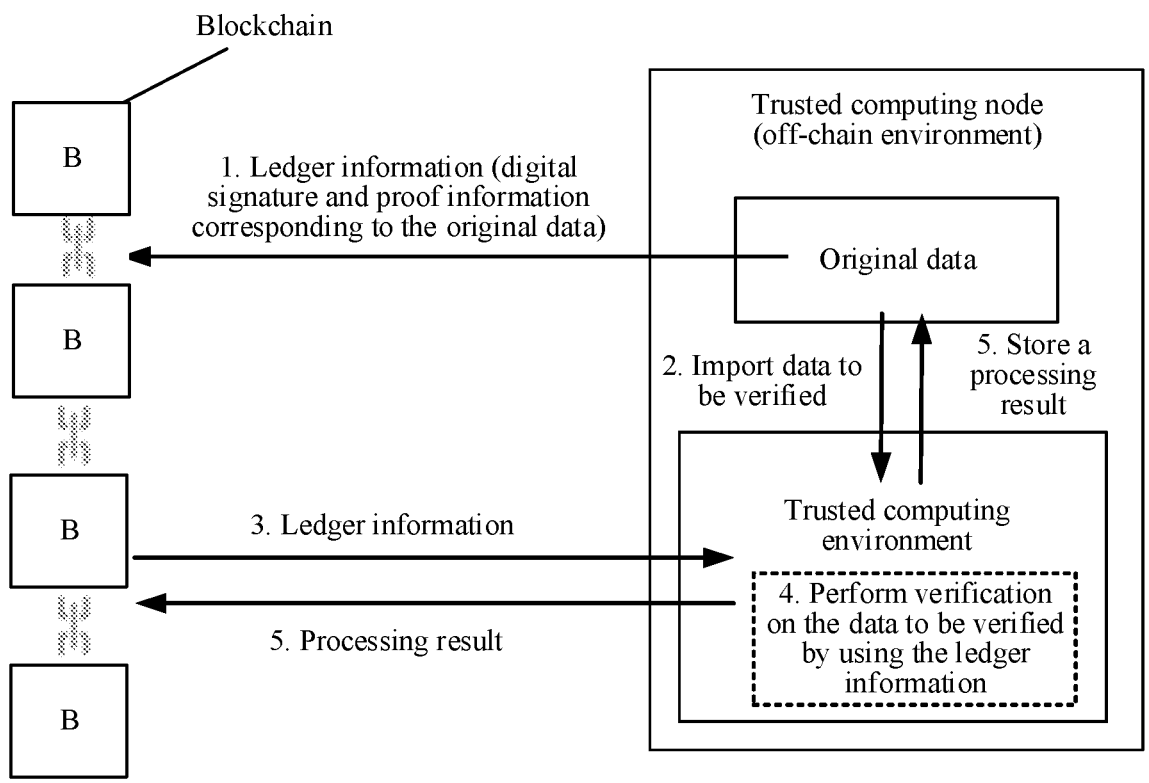
FIG. 4B is a schematic diagram of real-time communication between off-chain data and a blockchain according to an embodiment of this application.

FIG. 4B is a schematic diagram of real-time communication between off-chain data and a blockchain according to an embodiment of this application. As shown in FIG. 4B, because the raw data is private data, the raw data cannot be directly uploaded to the blockchain for depositing a certificate. After a trusted computing node establishes a connection to the blockchain in the manner shown in FIG. 4A, when an off-chain data source generates new raw data, the data is signed by using a private key corresponding to the trusted computing node, a timestamp may be packaged into the signature (digital signature) according to an actual situation, and the digital signature is stored into the blockchain as ledger information. The digital signature does not leak any information about the raw data. When off-chain data needs to be used, the data that need to be verified is transmitted to the trusted computing environment, ledger information corresponding to the raw data is queried from the blockchain, and verification is performed on the data that need to be verified in the trusted computing environment according to the ledger information (to verify whether a message digest of the data that need to be verified matches a message digest obtained by decrypting the ledger information). If the message digests do not match or there is no corresponding ledger information in the blockchain (that is, the data that need to be verified is not verified), it indicates that the local raw data has been tampered with, and the trusted computing node stops operating. If the message digests match (that is, the data that need to be verified is authentic), the trusted computing node performs subsequent data processing (such as calculating a conversion rate or extracting sensitive information) on the data that need to be verified, signs a processing result by using a public key of a trusted computing node that needs to view the processing result, and then stores the result and the signature in the blockchain as needed. Depending on different scenarios, the processing result may be off-chain raw data (that is, a scenario of verifying and publicizing trustworthiness of the off-chain data), or may be a result of a specific operation (that is, a result of a joint operation derived by combining on-line and off-chain data, such as calculation of a conversion rate). A node on the blockchain may determine, by verifying remote proof information of a trusted computing environment and a signature of the processing result, that the on-chain processing result is obtained through processing by a trusted computing environment and is reliable data.

Figure 4C:
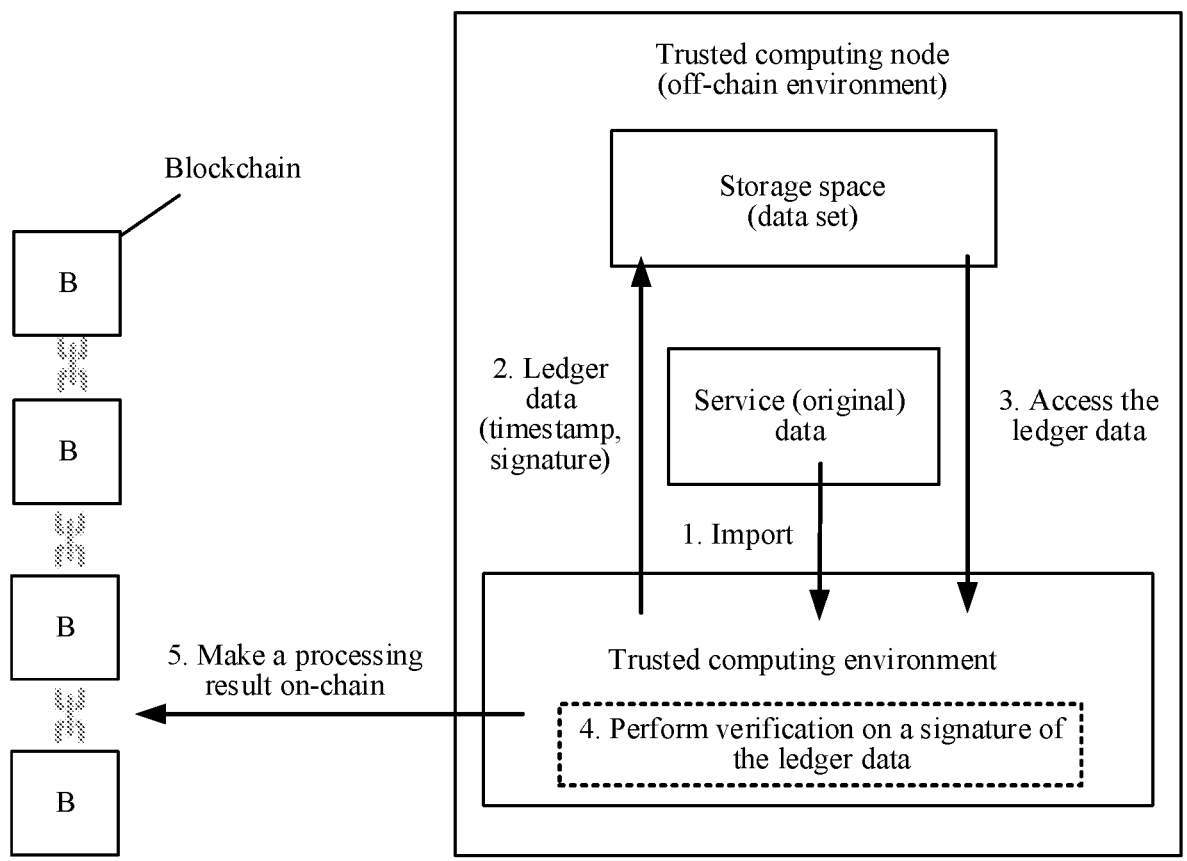
FIG. 4C is a schematic diagram showing that off-chain data cannot communicate with a blockchain in real time according to an embodiment of this application.

FIG. 4C is a schematic diagram showing that off-chain data cannot communicate with a blockchain in real time according to an embodiment of this application. As shown in FIG. 4C, the off-chain data cannot communicate with the blockchain in real time due to a network environment and other limitations, and a certificate cannot be on-chain when the data is generated. After the trusted computing node establishes a connection to the blockchain in the manner shown in FIG. 4A, the trusted computing environment may deposit a certificate off-chain for newly generated service (original) data. When off-chain data is generated, the trusted computing environment reads the off-chain data, adds a timestamp as needed, signs the raw data by using the private key corresponding to the trusted computing node, and stores the raw data the digital signature (and the timestamp) in an off-chain storage space as ledger information. When needing to use the off-chain data, the trusted computing node may obtain the corresponding data that need to be verified and ledger information from the storage space, and perform verification on the data that need to be verified in the trusted computing environment by using the ledger information (verify whether a message digest of the data that need to be verified matches a message digest obtained by decrypting the ledger information). If the message digests do not match or there is no corresponding ledger information in the blockchain (that is, the data that need to be verified is not verified), it indicates that the local raw data has been tampered with, and the trusted computing node stops operating. If the message digests match (that is, the data that need to be verified is authentic), the trusted computing node uploads, to the blockchain according to actual requirements, the raw data or a result obtained by processing the raw data by using a pre-agreed algorithm, and attaches a new signature to the uploaded data. The blockchain node may determine whether returned information is reliable by performing verification on a signature returned by the trusted computing node.

In one embodiment, if the trusted computing environment returns the raw data (that is, data requested by the blockchain can be publicized), the blockchain node may directly perform verification on raw data, a timestamp, and a signature during depositing of the certificate, to verify again whether the data has been tampered with.

The embodiments of this application provide a mechanism for intercommunication between a blockchain and off-chain data based on a trusted computing node. The interaction between the trusted computing node and the blockchain can ensure that the off-chain data obtained and used by the blockchain is authentic and reliable. In addition, the embodiments of this application provide a mechanism for intercommunication between a blockchain and off-chain confidential data, so that the blockchain can update on-chain information by using the off-chain data without publicizing the off-chain data. In addition, during the entire process, the blockchain can identify authenticity and reliability of the off-chain data, thereby avoiding trustworthiness impact from the off-chain data.

An embodiment of this application further provides a data processing method, including: obtaining raw data; signing the raw data by using a private key of the first trusted computing node to obtain a digital signature corresponding to the raw data, and storing the digital signature into the blockchain network as ledger information of the raw data; obtaining data that need to be verified corresponding to the raw data, transmitting the data that need to be verified to a trusted computing environment, querying the ledger information from the blockchain network, and performing verification on the data that need to be verified in the trusted computing environment according to the ledger information; and processing the data that need to be verified after the data that need to be verified is authentic, and returning a processing result of the data that need to be verified to the blockchain network.

In one embodiment, after the processing the data that need to be verified, the method further includes: signing a processing result of the data that need to be verified by using a public key of a second trusted computing node to obtain a signature result, the second trusted computing node being a trusted computing node that needs to view the processing result of the data that need to be verified; and returning the signature result for the signing of the processing result of the data that need to be verified to the blockchain network.

In one embodiment, the querying the ledger information from the blockchain network, and performing verification on the data that need to be verified in the trusted computing environment according to the ledger information includes: decrypting the ledger information by using a public key of the first trusted computing node to obtain a first message digest; performing message digest calculation on the data that need to be verified to obtain a second message digest; and verifying whether the first message digest matches the second message digest.

In one embodiment, the method further includes: sending remote proof information corresponding to the first trusted computing node and the public key of the first trusted computing node to the blockchain network; and obtaining a certificate corresponding to the first trusted computing node, the certificate being generated and sent after the blockchain network verifies the remote proof information, and the processing result of the data that need to be verified that is returned to the blockchain network carrying the certificate corresponding to the first trusted computing node.

An embodiment of this application provides another data processing method, applied to the target trusted computing node, and including: when raw data is generated, obtaining the raw data, the raw data being data outside a blockchain network; signing the raw data by using a private key corresponding to the target trusted computing node to obtain a digital signature corresponding to the raw data, and storing the raw data and the digital signature in a storage space outside the blockchain network; when data in the storage space outside the blockchain network needs to be obtained, obtaining data that need to be verified and the digital signature that correspond to the raw data from the storage space, and performing verification on the data that need to be verified in a trusted computing environment by using the digital signature; and processing the data that need to be verified, and returning a processing result of the data that need to be verified to the blockchain network.

The methods of the embodiments of this application are described in detail above. To better implement the foregoing solutions of the embodiments of this application, correspondingly, an apparatus of the embodiments of this application is provided below.

Figure 5A:
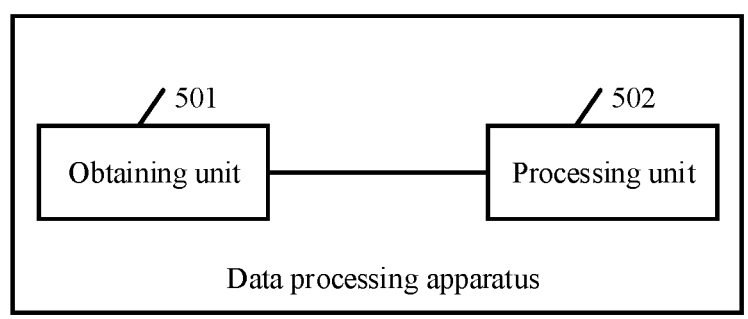
FIG. 5A is a schematic structural diagram of a data processing apparatus according to an embodiment of this application.

Referring to FIG. 5A, FIG. 5A is a schematic structural diagram of a data processing apparatus according to an embodiment of this application. The apparatus may be mounted on the intelligent device in the foregoing method embodiment. The intelligent device may be specifically the first trusted computing node 101 or the second trusted computing node 102 shown in FIG. 1A. The data processing apparatus shown in FIG. 5A may be configured to perform some or all functions in the method embodiments described in FIG. 2A and FIG. 3A. Detailed descriptions of units are as follows:

An obtaining unit 501 is configured to obtain data that need to be verified from a target trusted computing node; and obtain first ledger data corresponding to the data that need to be verified from an accessed blockchain network, the first ledger data for obtaining being obtained by signing a first message digest by using a private key of the target trusted computing node and being stored in the blockchain network by the target trusted computing node, and the first message digest being obtained by performing message digest calculation on raw data corresponding to the data that need to be verified.

A processing unit 502 is configured to decrypt the first ledger data by using a public key of the target trusted computing node to obtain the first message digest; perform message digest calculation on the data that need to be verified to obtain a second message digest; and determine a verification result of the data that need to be verified according to the first message digest and the second message digest.

In an embodiment, the data that need to be verified includes a ledger timestamp, and the blockchain network stores a timestamp of each piece of ledger data. The obtaining unit 501 is specifically configured to obtain the first ledger data corresponding to the data that need to be verified from the accessed blockchain network according to the ledger timestamp, a timestamp of the obtained first ledger data matching the ledger timestamp.

In an embodiment, the processing unit 502 is further configured to:

send remote proof information corresponding to the first trusted computing node and a public key of the first trusted computing node to the blockchain network, and obtain a certificate corresponding to the first trusted computing node from the blockchain network, the certificate being generated and sent after the blockchain network verifies the remote proof information.

After determining the verification result of the data that need to be verified according to the first message digest and the second message digest, the processing unit 502 is further configured to:

sign the verification result by using a public key corresponding to a second trusted computing node to obtain verification result signature data, the second trusted computing node being a trusted computing node that needs to view the verification result; and send a request message carrying the verification result signature data to the blockchain network through the first trusted computing node, the request message further carrying a certificate corresponding to the first trusted computing node, and the request message being used for instructing the blockchain network to store the verification result signature data after verifying the certificate; or the request message being used for instructing the blockchain network to store the verification result signature data according to a certificate sent to the first trusted computing node.

In an embodiment, the raw data includes service data, and the processing unit 502 is further configured to:

obtain service data and performing message digest calculation on the service data to obtain a third message digest;

sign the third message digest by using a private key corresponding to the first trusted computing node to obtain second ledger data; and upload the second ledger data and the certificate to the blockchain network for blockchain on-chain processing.

In an embodiment, the raw data includes service data, and the processing unit 502 is further configured to:

obtain the service data and perform message digest calculation on the service data to obtain a fourth message digest;

add the fourth message digest to a message digest set, the message digest set recording at least two message digests;

in response to detecting that the message digest set satisfies an on-chain condition, sign a message digest recorded in the message digest set by using a private key corresponding to the first trusted computing node to obtain third ledger data; and upload the third ledger data and the certificate to the blockchain network for blockchain on-chain processing.

In an embodiment, the data that need to be verified is advertisement distribution data, the data that need to be verified includes a first user set, and the first user set includes a first user object identifier; and the processing unit 502 is further configured to:

when the verification result indicates that the data that need to be verified is authentic, obtain associated data corresponding to the data that need to be verified, the associated data being advertisement-associated data, the advertisement-associated data including a second user set, and the second user set including a second user object identifier;

perform an intersection set operation on the first user set and the second user set to obtain a third user set; and determine advertisement promotion information based on the first user set, the second user set, and the third user set.

In an embodiment, the processing unit 502 is further configured to:

encrypt the advertisement promotion information by using a public key of a query trusted computing node for querying the advertisement promotion information, the query trusted computing node including trusted computing corresponding to the data that need to be verified and a trusted computing node corresponding to the associated data; and upload encrypted data to the blockchain network for blockchain on-chain processing.

In an embodiment, the processing unit 502 is specifically configured to: obtain the first ledger data corresponding to the data that need to be verified from the accessed blockchain network;

send a first ledger data obtaining request to the blockchain network, the first ledger data obtaining request being used for triggering the blockchain network to invoke a first smart contract to obtain the first ledger data corresponding to the data that need to be verified; and obtain the first ledger data of the blockchain network in response to the first ledger data obtaining request.

The processing unit 502 is specifically configured to: store the verification result signature data into the blockchain network; and send an on-chain request to the blockchain network, the on-chain request carrying the verification result signature data, and the on-chain request being used for triggering the blockchain network to invoke a second smart contract to store the verification result signature data into the blockchain network.

In an embodiment, the processing unit 502 is further configured to: in response to that the verification result indicates that the data that need to be verified is authentic, process the data that need to be verified and first data stored in the first trusted computing node to obtain a first result, and send the first result to a terminal device associated with the first trusted computing node, where the processing the data that need to be verified and first data stored in the first trusted computing node includes intersection set calculation processing or conversion rate calculation processing.

In an embodiment, the data that need to be verified is encrypted data obtained by the target trusted computing node by encrypting the raw data by using a target key, and the processing unit 502 is further configured to:

receive, from the target trusted computing node, a first slice of the target key that is encrypted by using the public key corresponding to the first trusted computing node, and decrypt the encrypted first slice of the target key by using the private key corresponding to the first trusted computing node to obtain the first slice of the target key;

encrypt the first slice of the target key by using a public key of a third trusted computing node, and send the encrypted first slice to the third trusted computing node;

receive, from the third trusted computing node, a second slice of the target key by using the public key corresponding to the first trusted computing node, and decrypt the encrypted second slice of the target key by using the private key corresponding to the first trusted computing node to obtain the second slice of the target key;

obtain the target key based on the first slice of the target key and the second slice of the target key; and decrypt the encrypted data by using the target key to obtain the data that need to be verified.

Figure 5B:
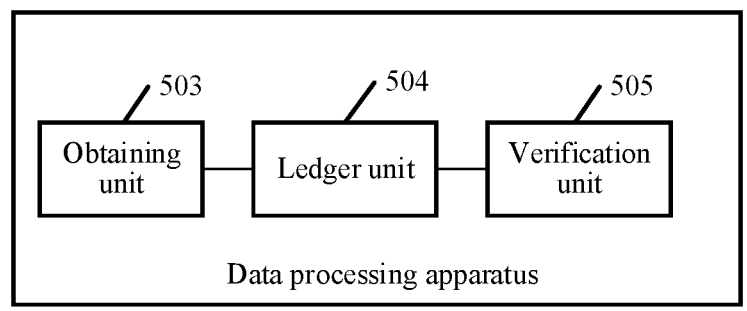
FIG. 5B is a schematic structural diagram of another data processing apparatus according to an embodiment of this application.

FIG. 5B is a schematic structural diagram of another data processing apparatus according to an embodiment of this application. The apparatus may be mounted on the intelligent device in the foregoing method embodiment. The intelligent device may be specifically the first trusted computing node 101 or the second trusted computing node 102 shown in FIG. 1A. That the apparatus is mounted on the second trusted computing node 102 shown in FIG. 1A is used as an example for description. As shown in FIG. 5B, the data processing apparatus includes:

an obtaining unit 503, configured to send remote proof information corresponding to a target trusted computing node and a public key of the target trusted computing node to a blockchain network, to obtain a certificate corresponding to the target trusted computing node from the blockchain network;

a ledger unit 504, configured to obtain raw data; perform message digest calculation on the raw data to obtain a message digest of the raw data, and sign the message digest by using a private key of the target trusted computing node to obtain ledger data; and upload the ledger data to the blockchain network, and provide the blockchain network with the certificate to prove that the ledger data is trustworthy; and a verification unit 505, configured to send data that need to be verified corresponding to the raw data to a first trusted computing node, so that the first trusted computing node performs verification on the data that need to be verified by using the ledger data.

In one embodiment, the raw data is service data. Therefore, the ledger unit 504 obtains the service data; performs message digest calculation on the service data to obtain a message digest corresponding to the service data; adds the message digest corresponding to the service data to a message digest set, the message digest set being used for storing message digests generated within a preset time period, and the message digest set recording at least two message digests; in response to detecting that the message digest set satisfies an on-chain condition, signs a message digest recorded in the message digest set by using the private key corresponding to the target trusted computing node to obtain ledger data corresponding to the message digest set or ledger data; and uploads the obtained ledger data corresponding to the message digest set to the blockchain network for blockchain on-chain processing.

According to one embodiment, the data that need to be verified is sent to N trusted computing nodes including the first trusted computing node, N being a positive integer. The verification unit 505 is configured to encrypt the raw data by using a target key to obtain encrypted data; and divide the target key into N slices, encrypt a slice of a target key corresponding to each of the N trusted computing nodes by using a public key of the each trusted computing node, and send, to the each trusted computing node, the encrypted data and the encrypted slice of the key that corresponds to the trusted computing node.

According to one embodiment, some of the steps involved in the data processing methods shown in FIG. 2A and FIG. 3A may be performed by the units in the data processing apparatus shown in FIG. 5A. For example, step S202 shown in FIG. 2A may be performed by the obtaining unit 501 shown in FIG. 5A, and step S201, step S203, and step S204 may be performed by the processing unit 502 shown in FIG. 5A. Step S302 shown in FIG. 3A may be performed by the obtaining unit 501 shown in FIG. 5A, and step S301 and step S303 to step S309 may be performed by the processing unit 502 shown in FIG. 5A. Some of the steps involved in the data processing method shown in FIG. 2B may be performed by the units in the data processing apparatus shown in FIG. 5B. For example, step S205 shown in FIG. 2B may be performed by the obtaining unit 503 shown in FIG. 5B, step S206, step S207, and step S208 may be performed by the ledger unit 504 shown in FIG. 5B, and step S209 may be performed by the processing unit 505 shown in FIG. 5B. Units of the data processing apparatus shown in FIG. 5A and FIG. 5B may be separately or wholly combined into one or several other units, or one (or more) of the units herein may further be divided into multiple units of smaller functions. In this way, same operations can be implemented, and implementation of the technical effects of the embodiments of this application is not affected. The foregoing units are divided based on logical functions. In one embodiment, a function of one unit may also be implemented by multiple units, or functions of multiple units are implemented by one unit. In another embodiment of this application, the data processing apparatus may also include other units. In one embodiment, the functions may also be cooperatively implemented by other units and may be cooperatively implemented by a plurality of units.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

According to another embodiment of this application, a computer program (including program code) that can perform the steps in the corresponding method shown in FIG. 2A, FIG. 2B, and FIG. 3A may be run on a general computing apparatus, such as a computer, which includes processing elements and storage elements such as a central processing unit (CPU), a random access memory (RAM), and a read-only memory (ROM), to construct the data processing apparatus shown in FIG. 5A and FIG. 5B and implement the data processing method in the embodiments of this application. The computer program may be recorded in, for example, a computer readable recording medium, and may be loaded into the foregoing computing device by using the computer readable recording medium, and run on the computing apparatus.

Based on the same inventive idea, the problem solving principles and beneficial effects of the data processing apparatuses provided in the embodiments of this application are similar to the problem solving principles and beneficial effects of the data processing apparatuses in the method embodiments of this application. For the principles and beneficial effects, refer to the principles and beneficial effects of the implementations of the methods. For ease of description, details are not described herein again.

Figure 6:
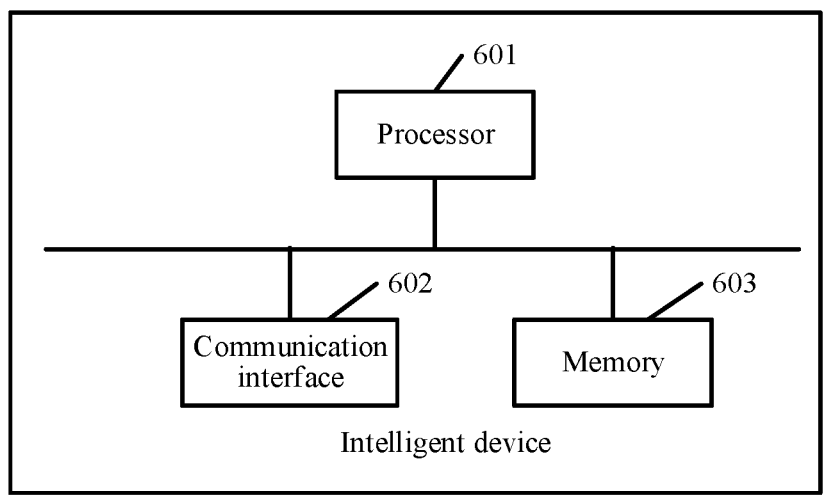
FIG. 6 is a schematic structural diagram of an intelligent device according to an embodiment of this application.

Referring to FIG. 6, FIG. 6 is a schematic structural diagram of an intelligent device according to an embodiment of this application. The intelligent device includes at least a processor 601, a communication interface 602, and a memory 603. The processor 601, the communication interface 602, and the memory 603 may be connected through a bus or in another manner. The processor 601 (or referred to as a central processing unit (CPU)) is a computing core and control core of a terminal, and can parse various types of instructions in the terminal and process various types of data of the terminal. For example, the CPU may be configured to parse a power-on/off instruction sent by a user to the terminal, and control the terminal to perform a power-on/off operation. For another example, the CPU can transmit various types of interaction data between structures inside the terminal, and so on. The communication interface 602 may include a standard wired interface or wireless interface (for example, WI-FI or a mobile communication interface), and may be configured to receive and send data under control of the processor 601. The communication interface 602 may be further configured for transmission and interaction of data inside the terminal. The memory 603 is a storage device in the terminal, and configured to store programs and data. It may be understood that the memory 603 herein may include an internal memory of the terminal and certainly may also include an extended memory supported by the terminal. The memory 603 provides a storage space, and the storage space stores an operating system of the terminal. The operating system may include, but is not limited to: an Android system, an iOS system, a Windows Phone system, and the like. This is not limited in this application.

In this embodiment, the processor 601 runs executable program code in the memory 603 to perform the following operations:

obtaining data that need to be verified from a target trusted computing node through the communication interface 602; obtaining first ledger data corresponding to the data that need to be verified from an accessed blockchain network, the first ledger data for obtaining being obtained by signing a first message digest by using a private key of the target trusted computing node and being stored in the blockchain network by the target trusted computing node, and the first message digest being obtained by performing message digest calculation on raw data corresponding to the data that need to be verified; and decrypting the first ledger data by using a public key of the target trusted computing node to obtain the first message digest; performing message digest calculation on the data that need to be verified to obtain a second message digest; and determining a verification result of the data that need to be verified according to the first message digest and the second message digest.

In an embodiment, the data that need to be verified includes a ledger timestamp, and the blockchain network stores a timestamp of each piece of ledger data. A specific embodiment in which the processor 601 obtains the first ledger data corresponding to the data that need to be verified from the accessed blockchain network is:

obtaining the first ledger data corresponding to the data that need to be verified from the accessed blockchain network according to the ledger timestamp, a timestamp of the obtained first ledger data matching the ledger timestamp.

In an embodiment, the processor 601 is further configured to:

send remote proof information corresponding to the first trusted computing node and a public key of the first trusted computing node to the blockchain network to obtain a certificate corresponding to the first trusted computing node from the blockchain network, the certificate being generated and sent after the blockchain network verifies the remote proof information; and after determining the verification result of the data that need to be verified according to the first message digest and the second message digest, the processor 601 is further configured to:

sign the verification result by using a public key corresponding to a second trusted computing node to obtain verification result signature data, the second trusted computing node being a trusted computing node that needs to view the verification result; and send a request message carrying the verification result signature data to the blockchain network through the first trusted computing node, the request message further carrying a certificate corresponding to the first trusted computing node, and the request message being used for instructing the blockchain network to store the verification result signature data after verifying the certificate; or the request message being used for instructing the blockchain network to store the verification result signature data according to a certificate sent to the first trusted computing node.

In an embodiment, the processor 601 is further configured to:

obtain service data and perform message digest calculation on the service data to obtain a third message digest;

sign the third message digest by using a private key corresponding to the first trusted computing node to obtain second ledger data; and upload the second ledger data and the certificate to the blockchain network for blockchain on-chain processing.

In an embodiment, the processor 601 is further configured to:

obtain service data and perform message digest calculation on the service data to obtain a fourth message digest;

add the fourth message digest to a message digest set, the message digest set recording at least two message digests;

in response to detecting that the message digest set satisfies an on-chain condition, sign a message digest recorded in the message digest set by using a private key corresponding to the first trusted computing node to obtain third ledger data; and upload the third ledger data and the certificate to the blockchain network for blockchain on-chain processing.

In an embodiment, the data that need to be verified is advertisement distribution data, the data that need to be verified includes a first user set, and the first user set includes a first user object identifier; and the processor 601 is further configured to:

when the verification result indicates that the data that need to be verified is authentic, obtain associated data corresponding to the data that need to be verified, the associated data being advertisement-associated data, the advertisement-associated data including a second user set, and the second user set including a second user object identifier;

perform an intersection set operation on the first user set and the second user set to obtain a third user set; and determine advertisement promotion information based on the first user set, the second user set, and the third user set.

In an embodiment, the processor 601 is further configured to:

encrypt the advertisement promotion information by using a public key of a query trusted computing node for querying the advertisement promotion information, the query trusted computing node including trusted computing corresponding to the data that need to be verified and a trusted computing node corresponding to the associated data; and upload encrypted data to the blockchain network for blockchain on-chain processing.

In an embodiment, a specific embodiment in which the processor 601 obtains the first ledger data corresponding to the data that need to be verified from the accessed blockchain network is:

sending a first ledger data obtaining request to the blockchain network, the first ledger data obtaining request being used for triggering the blockchain network to invoke a first smart contract to obtain the first ledger data corresponding to the data that need to be verified; and obtaining the first ledger data of the blockchain network in response to the first ledger data obtaining request.

A specific embodiment in which the processor 601 stores the verification result signature data into the blockchain network is:

sending an on-chain request to the blockchain network, the on-chain request carrying the verification result signature data, and the on-chain request being used for triggering the blockchain network to invoke a second smart contract to store the verification result signature data into the blockchain network.

Based on the same inventive idea, the problem solving principles and beneficial effects of the intelligent device provided in the embodiments of this application are similar to the problem solving principles and beneficial effects of the data processing methods in the method embodiments of this application. For the principles and beneficial effects, refer to the principles and beneficial effects of the implementations of the methods. For ease of description, details are not described herein again.

An embodiment of this application further provides a computer-readable storage medium, storing one or more instructions, the one or more instructions being adapted to be loaded by the processor to perform the data processing method described in the foregoing method embodiments.

An embodiment of this application further provides a computer program product including instructions, the instructions, when run on a computer, causing the computer to perform the data processing method described in the foregoing method embodiments.

An embodiment of this application further provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the data processing method described above.

The steps in the methods of the embodiments of this application may be rearranged, combined, and deleted according to specific requirements.

The modules in the apparatuses of the embodiments of this application may be combined, divided, and deleted according to specific requirements.

A person of ordinary skill in the art may understand that all or some of the steps of the methods in the foregoing embodiments may be implemented by a program instructing relevant hardware. The program may be stored in a computer-readable storage medium. The readable storage medium may include a flash disk, a read-only memory (ROM), a random access memory (RAM), a magnetic disk, an optical disc, and the like.

The foregoing descriptions are merely exemplary embodiments of this application, and are not intended to limit the scope of this application. A person skilled in the art may understand all or some processes of the foregoing embodiments, and equivalent modifications made according to the claims of this application shall still fall within the scope of the present disclosure.

What is claimed is:

1. A data processing method, applied to a first trusted computing node, and comprising:
   obtaining data to be verified from a target trusted computing node, the data to be verified being data stored by a target terminal device corresponding to the target trusted computing node in the target trusted computing node;
   obtaining first ledger data corresponding to the data to be verified from an accessed blockchain network, the first ledger data being obtained by signing a first message digest by using a private key of the target trusted computing node and being stored in the blockchain network by the target trusted computing node, and the first message digest being obtained by performing message digest calculation on raw data corresponding to the data to be verified;
   decrypting the first ledger data by using a public key of the target trusted computing node to obtain the first message digest;
   performing message digest calculation on the data to be verified to obtain a second message digest;
   determining a verification result of the data to be verified according to the first message digest and the second message digest; and
   in response to that the verification result indicates that the data to be verified is authentic, processing the data to be verified and first data stored by a first terminal device in the first trusted computing node to obtain a first result, and sending the first result to the first terminal device associated with the first trusted computing node, wherein the processing the data to be verified and the first data comprises intersection set calculation processing or conversion rate calculation processing.

2. The method according to claim 1, wherein the data to be verified comprises a ledger timestamp, and the blockchain network stores a timestamp of each piece of ledger data; and the obtaining first ledger data corresponding to the data to be verified from an accessed blockchain network comprises:
   obtaining the first ledger data corresponding to the data to be verified from the accessed blockchain network according to the ledger timestamp, a timestamp of the obtained first ledger data matching the ledger timestamp.

3. The method according to claim 1, wherein the method further comprises:
   sending remote proof information corresponding to the first trusted computing node and a public key of the first trusted computing node to the blockchain network to obtain a certificate corresponding to the first trusted computing node from the blockchain network, the certificate being generated and sent after the blockchain network verifies the remote proof information; and
   after the determining a verification result of the data to be verified according to the first message digest and the second message digest, the method comprises:
   signing the verification result by using a public key corresponding to a second trusted computing node to obtain verification result signature data, the second trusted computing node being a trusted computing node that needs to view the verification result; and
   sending a request message carrying the verification result signature data to the blockchain network through the first trusted computing node,
   the request message further carrying a certificate corresponding to the first trusted computing node, and the request message being used for instructing the blockchain network to store the verification result signature data after verifying the certificate; or
   the request message being used for instructing the blockchain network to store the verification result signature data according to a certificate sent to the first trusted computing node.

4. The method according to claim 3, wherein the method further comprises:
   obtaining service data and performing message digest calculation on the service data to obtain a third message digest;
   signing the third message digest by using a private key corresponding to the first trusted computing node to obtain second ledger data; and
   uploading the second ledger data and the certificate to the blockchain network for blockchain on-chain processing.

5. The method according to claim 3, wherein the method further comprises:
   obtaining service data and performing message digest calculation on the service data to obtain a fourth message digest;
   adding the fourth message digest to a message digest set, the message digest set recording at least two message digests;
   in response to detecting that the message digest set satisfies an on-chain condition, signing a message digest recorded in the message digest set by using a private key corresponding to the first trusted computing node to obtain third ledger data; and
   uploading the third ledger data and the certificate to the blockchain network for blockchain on-chain processing.

6. The method according to claim 1, wherein the data to be verified is advertisement distribution data, the data to be verified comprises a first user set, the first user set comprises a first user object identifier, and the method further comprises:
   when the verification result indicates that the data to be verified is authentic, obtaining associated data corresponding to the data to be verified, the associated data being advertisement-associated data, the advertisement-associated data comprising a second user set, and the second user set comprising a second user object identifier;
   performing an intersection set operation on the first user set and the second user set to obtain a third user set; and
   determining advertisement promotion information based on the first user set, the second user set, and the third user set.

7. The method according to claim 6, wherein the method further comprises:
   encrypting the advertisement promotion information by using a public key of a query trusted computing node for querying the advertisement promotion information, the query trusted computing node comprising trusted computing corresponding to the data to be verified and a trusted computing node corresponding to the associated data; and
   uploading encrypted data to the blockchain network for blockchain on-chain processing.

8. The method according to claim 3, wherein the obtaining first ledger data corresponding to the data to be verified from an accessed blockchain network comprises:
   sending a first ledger data obtaining request to the blockchain network, the first ledger data obtaining request being used for triggering the blockchain network to invoke a first smart contract to obtain the first ledger data corresponding to the data to be verified; and obtaining the first ledger data of the blockchain network in response to the first ledger data obtaining request; and storing the verification result signature data into the blockchain network comprises:

sending an on-chain request to the blockchain network, the on-chain request carrying the verification result signature data, and the on-chain request being used for triggering the blockchain network to invoke a second smart contract to store the verification result signature data into the blockchain network.

9. A non-transitory computer-readable storage medium, storing a computer program, and the computer program, when executed by a processor of a first trusted computing node, casing the processor to implement:

obtaining data to be verified from a target trusted computing node, the data to be verified being data stored by a target terminal device corresponding to the target trusted computing node in the target trusted computing node;

obtaining first ledger data corresponding to the data to be verified from an accessed blockchain network, the first ledger data being obtained by signing a first message digest by using a private key of the target trusted computing node and being stored in the blockchain network by the target trusted computing node, and the first message digest being obtained by performing message digest calculation on raw data corresponding to the data to be verified;

decrypting the first ledger data by using a public key of the target trusted computing node to obtain the first message digest;

performing message digest calculation on the data to be verified to obtain a second message digest;

determining a verification result of the data to be verified according to the first message digest and the second message digest; and in response to that the verification result indicates that the data to be verified is authentic, processing the data to be verified and first data stored by a first terminal device in the first trusted computing node to obtain a first result, and sending the first result to the first terminal device associated with the first trusted computing node, wherein the processing the data to be verified and the first data comprises intersection set calculation processing or conversion rate calculation processing.

10. The computer-readable storage medium according to claim 9, wherein the data to be verified comprises a ledger timestamp, and the blockchain network stores a timestamp of each piece of ledger data; and the obtaining first ledger data corresponding to the data to be verified from an accessed blockchain network comprises:

obtaining the first ledger data corresponding to the data to be verified from the accessed blockchain network according to the ledger timestamp, a timestamp of the obtained first ledger data matching the ledger timestamp.

11. The computer-readable storage medium according to claim 9, wherein the computer program further causes the processor to implement sending remote proof information corresponding to the first trusted computing node and a public key of the first trusted computing node to the blockchain network to obtain a certificate corresponding to the first trusted computing node from the blockchain network, the certificate being generated and sent after the blockchain network verifies the remote proof information; and after the determining a verification result of the data to be verified according to the first message digest and the second message digest, the computer program further causes the processor to implement:

signing the verification result by using a public key corresponding to a second trusted computing node to obtain verification result signature data, the second trusted computing node being a trusted computing node that needs to view the verification result; and sending a request message carrying the verification result signature data to the blockchain network through the first trusted computing node, the request message further carrying a certificate corresponding to the first trusted computing node, and the request message being used for instructing the blockchain network to store the verification result signature data after verifying the certificate; or the request message being used for instructing the blockchain network to store the verification result signature data according to a certificate sent to the first trusted computing node.

12. The computer-readable storage medium according to claim 11, wherein the computer program further causes the processor to implement:

obtaining service data and performing message digest calculation on the service data to obtain a third message digest;

signing the third message digest by using a private key corresponding to the first trusted computing node to obtain second ledger data; and uploading the second ledger data and the certificate to the blockchain network for blockchain on-chain processing.

13. The computer-readable storage medium according to claim 11, wherein the computer program further causes the processor to implement:

obtaining service data and performing message digest calculation on the service data to obtain a fourth message digest;

adding the fourth message digest to a message digest set, the message digest set recording at least two message digests;

in response to detecting that the message digest set satisfies an on-chain condition, signing a message digest recorded in the message digest set by using a private key corresponding to the first trusted computing node to obtain third ledger data; and uploading the third ledger data and the certificate to the blockchain network for blockchain on-chain processing.

14. The computer-readable storage medium according to claim 9, wherein the data to be verified is advertisement distribution data, the data to be verified comprises a first user set, the first user set comprises a first user object identifier, and the computer program further causes the processor to implement:

when the verification result indicates that the data to be verified is authentic, obtaining associated data corresponding to the data to be verified, the associated data being advertisement-associated data, the advertisement-associated data comprising a second user set, and the second user set comprising a second user object identifier;

performing an intersection set operation on the first user set and the second user set to obtain a third user set; and determining advertisement promotion information based on the first user set, the second user set, and the third user set.

15. The computer-readable storage medium according to claim 14, wherein the computer program further causes the processor to implement:
encrypting the advertisement promotion information by using a public key of a query trusted computing node for querying the advertisement promotion information, the query trusted computing node comprising trusted computing corresponding to the data to be verified and a trusted computing node corresponding to the associated data; and
uploading encrypted data to the blockchain network for blockchain on-chain processing.

16. The computer-readable storage medium according to claim 11, wherein the obtaining first ledger data corresponding to the data to be verified from an accessed blockchain network comprises:
sending a first ledger data obtaining request to the blockchain network, the first ledger data obtaining request being used for triggering the blockchain network to invoke a first smart contract to obtain the first ledger data corresponding to the data to be verified; and
obtaining the first ledger data of the blockchain network in response to the first ledger data obtaining request; and
storing the verification result signature data into the blockchain network comprises:
sending an on-chain request to the blockchain network, the on-chain request carrying the verification result signature data, and the on-chain request being used for triggering the blockchain network to invoke a second smart contract to store the verification result signature data into the blockchain network.

17. A computing device of a first trusted computing node, comprising:
a processor, and a memory coupled to the processor and configured to store a computer program, the computer program including program instructions, and the processor being configured to invoke the program instructions to perform:
obtaining data to be verified from a target trusted computing node, the data to be verified being data stored by a target terminal device corresponding to the target trusted computing node in the target trusted computing node;
obtaining first ledger data corresponding to the data to be verified from an accessed blockchain network, the first ledger data being obtained by signing a first message digest by using a private key of the target trusted computing node and being stored in the blockchain network by the target trusted computing node, and the first message digest being obtained by performing message digest calculation on raw data corresponding to the data to be verified;
decrypting the first ledger data by using a public key of the target trusted computing node to obtain the first message digest;
performing message digest calculation on the data to be verified to obtain a second message digest;
determining a verification result of the data to be verified according to the first message digest and the second message digest; and in response to that the verification result indicates that the data to be verified is authentic, processing the data to be verified and first data stored by a first terminal device in the first trusted computing node to obtain a first result, and sending the first result to the first terminal device associated with the first trusted computing node, wherein the processing the data to be verified and the first data comprises intersection set calculation processing or conversion rate calculation processing.

18. The device according to claim 17, wherein the data to be verified comprises a ledger timestamp, and the blockchain network stores a timestamp of each piece of ledger data; and the obtaining first ledger data corresponding to the data to be verified from an accessed blockchain network comprises:
obtaining the first ledger data corresponding to the data to be verified from the accessed blockchain network according to the ledger timestamp, a timestamp of the obtained first ledger data matching the ledger timestamp.

19. The device according to claim 17, wherein the processor is further configured to perform:
sending remote proof information corresponding to the first trusted computing node and a public key of the first trusted computing node to the blockchain network to obtain a certificate corresponding to the first trusted computing node from the blockchain network, the certificate being generated and sent after the blockchain network verifies the remote proof information; and
after the determining a verification result of the data to be verified according to the first message digest and the second message digest, the processor is further configured to perform:
signing the verification result by using a public key corresponding to a second trusted computing node to obtain verification result signature data, the second trusted computing node being a trusted computing node that needs to view the verification result; and
sending a request message carrying the verification result signature data to the blockchain network through the first trusted computing node,
the request message further carrying a certificate corresponding to the first trusted computing node, and the request message being used for instructing the blockchain network to store the verification result signature data after verifying the certificate; or
the request message being used for instructing the blockchain network to store the verification result signature data according to a certificate sent to the first trusted computing node.

20. The device according to claim 19, wherein the processor is further configured to perform:
obtaining service data and performing message digest calculation on the service data to obtain a third message digest;
signing the third message digest by using a private key corresponding to the first trusted computing node to obtain second ledger data; and
uploading the second ledger data and the certificate to the blockchain network for blockchain on-chain processing.

* * * * *